US006161099A

United States Patent [19]

Harrington et al.

[11] Patent Number: 6,161,099

[45] Date of Patent: *Dec. 12, 2000

[54] PROCESS AND APPARATUS FOR CONDUCTING AUCTIONS OVER ELECTRONIC NETWORKS

[75] Inventors: Myles C. S. Harrington, Pittsburgh; Daniel J. Veres, West View, both of Pa.; Robert M. Panoff, Durham, N.C.

[73] Assignee: MuniAuction, Inc., Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 09/087,574

[22] Filed: May 29, 1998

Related U.S. Application Data

[60] Provisional application No. 60/047,876, May 29, 1997.

[51] Int. Cl.[7] .................... G06F 17/60

[52] U.S. Cl. .................... 705/37; 705/36

[58] Field of Search .................... 705/37, 36, 35; 455/31.2

[56] References Cited

U.S. PATENT DOCUMENTS

| | | | |
|---|---|---|---|
| 3,581,072 | 5/1971 | Nymeyer . | |
| 4,789,928 | 12/1988 | Fujisaki . | |
| 4,903,201 | 2/1990 | Wagner . | |
| 4,980,826 | 12/1990 | Wagner . | |
| 5,077,665 | 12/1991 | Silverman et al. . | |
| 5,136,501 | 8/1992 | Silverman et al. . | |
| 5,243,515 | 9/1993 | Lee . | |
| 5,375,055 | 12/1994 | Togher et al. . | |
| 5,497,317 | 3/1996 | Hawkins et al. . | |
| 5,502,637 | 3/1996 | Beaulieu et al. . | |
| 5,640,569 | 6/1997 | Miller et al. . | |
| 5,774,176 | 6/1998 | Carter | 705/36 |
| 5,774,880 | 6/1998 | Ginsberg | 705/36 |
| 5,794,207 | 8/1998 | Walker et al. | 705/37 |
| 5,802,501 | 9/1998 | Graff . | |
| 5,845,266 | 12/1998 | Lupien et al. | 705/37 |
| 5,857,176 | 1/1999 | Ginsberg | 705/36 |
| 5,905,974 | 5/1999 | Fraser et al. | 705/37 |
| 5,905,975 | 5/1999 | Ausubel | 705/37 |
| 5,915,209 | 6/1999 | Lawrence | 455/31.2 |

OTHER PUBLICATIONS

Landes, David V., Aug. 16, 1996 Letter with attachments.
Thomas, Rick, Aug. 28, 1996 Letter with attachment.

(List continued on next page.)

*Primary Examiner*—Eric W. Stamber
*Assistant Examiner*—Forest Thompson, Jr.
*Attorney, Agent, or Firm*—Nixon & Vanderhye P.C.

[57] ABSTRACT

An apparatus and process for conducting auctions, specifically municipal bond auctions, over electronic networks, particularly the Internet, is disclosed. The auctioneer maintains a web site from which information about bonds to be auctioned can be obtained. A user participates in the auction by accessing the web site via a conventional Internet browser and is led through a sequence of screens that perform the functions of verifying the user's identity, assisting the user in preparing a bid, verifying that the bid conforms to the rules of the auction, displaying to the user during the course of the auction selected bid information regarding bids received and informing the bidder how much time remains in the auction. The user may be given the option of confirming the accuracy of his bid before submitting the bid. The auctioneer is able to review bidding history, determine the winner and notify the winner over the network, and display selected auction results to bidders and observers over the network.

67 Claims, 15 Drawing Sheets

OTHER PUBLICATIONS

"Sample Form of MuniBid™ Notice of Sale," 9 pages.

Brochure, "Introduction to MuniBid™ Optimizing Municipal Bond Sales," 13 pgs.

"BiDCOMP Competetive Bidding System," screen capture, 16 pgs., Jan. 20, 1998, Mar. 3, 1998.

Pamphlet entitled MuniBid.

Resnick, Parity On–Line Bidding Program Wins Positive Reviews, The Bond Buyer, May 7, 1997.

Parity . . . and the Municipal Securities Issuer, author and date unknown.

Parity brochure, Copyright 1992, 21st Century Municipals, Inc.

"Internet Benefits SF Redevelopment Offering,"California Public Finance, v10, n21, pN/A, Jan. 13, 1997.

Dazzo, Nicholas J.; "In Today's Muni Market, Data Bases, Not Books, Provide Dealers, Clients With Timely Bond Data: Municipal bond dealers have never had it so easy," The Bond Buyer, v289, #2821, Aug. 29, 1989.

"JP Morgan and Capital Link in Bid to develop Electronic Auction for Corporate Debt Securities," Trading Systems Tedhnology, c2, n20, Apr. 24, 1989.

"Grant Street Advisors Is Setting Up The First Muni Bond Auction Web Site," The Bond Buyer, v320, #30159, p. 1, Jun. 4, 1997.

Richmyer, Richard; "Survey Shows Bond Market is Warming Up to Electronic Trading, " The Bond buyer, v321, #30213, Aug. 20, 1997.

Stirland, Sarah; "News and Trends: Brokers–Dealers to hawk Products Via Satellitea nad cable TV," The Bond Buyer, v320, #30125, Apr. 16, 1997.

U.S. Trademark File History for mark "PARITY & Design" (Reg. No. 1772581) including specimen entitled "PARITY A Real–Time, No–Risk Bidding Network From 21$^{st}$ Century Municipals" (1992).

Morgenstern, Renata, "Electronic Bidding for Municipal Bonds: Technology Innovations for Competitive Bond Sales," pp. 23–25 *Government Finance Review* (Feb. 2000).

Richtmyer, "Gaining PARITY: Dalcomp Purchases Electronic Bid System To Exploit Internet", *The Bond Buyer* (Feb. 25, 1998).

Whalen, Robert, "Where is Dalcomp? New Product Awaits Inaugural Deal," *The Bond Buyer* (Aug. 19, 1998).

Whalen, Robert,"Dalcomp's Electronic Bidding System Set to Debut With Wisconsin GO Deal," *Bond Buyer*, (Aug. 21, 1998).

Apr. 30, 1996 Fax from PARITY.

Document entitled: "Q: What Do These Issues Have in Common?".

Official Notice of Sale, Tennessee Local Development Authority.

Bid Form Tennessee Local Development Authority.

PARITY Bid Form.

PARITY Form of Agreement.

Suggested language document.

"Financial Advisors/Issuers" document, "The Financial Adviser Receives A Bid Status Report . . . ".

Financial Advisors/Issuers document, "Financial Advisors/ Issuers see the following data for each bid and for each issue by dialing 206–635–0940 (this information only shows after the deadline for receipt of bids).".

REGISTRATION QUESTIONS (Fields displayed in bold below are required.)

- FIRST NAME:
- LAST NAME:
- ORGANIZATION:
- ADDRESS (1st Line):
- ADDRESS (2nd Line):
- CITY:
- STATE:
- ZIP:
- TELEPHONE:
- TELEFAX:
- E-MAIL:
- MOTHER'S MAIDEN NAME: (for security reasons only, e.g., verify your identity by phone)

— 28

26

Selections

| Issuer | State | Description | Size* | Auction Date* | Start Time* |
|---|---|---|---|---|---|
| City of Trial Auction (All-or-None) | OR | Limited Tax Revenue Bonds 1998 Series A | $29,000,000 | Any Day | Any Time |
| (Amendments modified 4/20/98 @ 10:14 pm) | | | | | |
| Enter Auction / View Notice of Sale / View Amendments / View POS | | | | | |
| City of Trial Auction (Maturity-by-Maturity) | OR | Limited Tax Revenue Bonds 1998 Series A | $29,000,000 | Any Day | Any Time |
| (Amendments modified 4/20/98 @ 10:14 pm) | | | | | |
| Enter Auction / View Notice of Sale / View Amendments / View POS | | | | | |
| City of Portland (All-or-None) | OR | Limited Tax Revenue Bonds 1998 Series A | $29,000,000 | 4/21/98 | 11:30 am EDT |
| (Amendments modified 4/20/98 @ 10:14 pm) | | | | | |
| Observe Results / View Notice of Sale / View Amendments / View POS / Request Admission | | | | | |
| City of Portland (Maturity-by-Maturity) | OR | Limited Tax Revenue Bonds 1998 Series A | $29,000,000 | 4/21/98 | 11:30 am EDT |
| (Amendments modified 4/20/98 @ 10:14 pm) | | | | | |
| Observe Results / View Notice of Sale / View Amendments / View POS / Request Admission | | | | | |

Go to: MuniAuction Home Page, Rules (modified 4/16/98 @5:01 pm), Instructions, Reminders, Results

Figure 6:
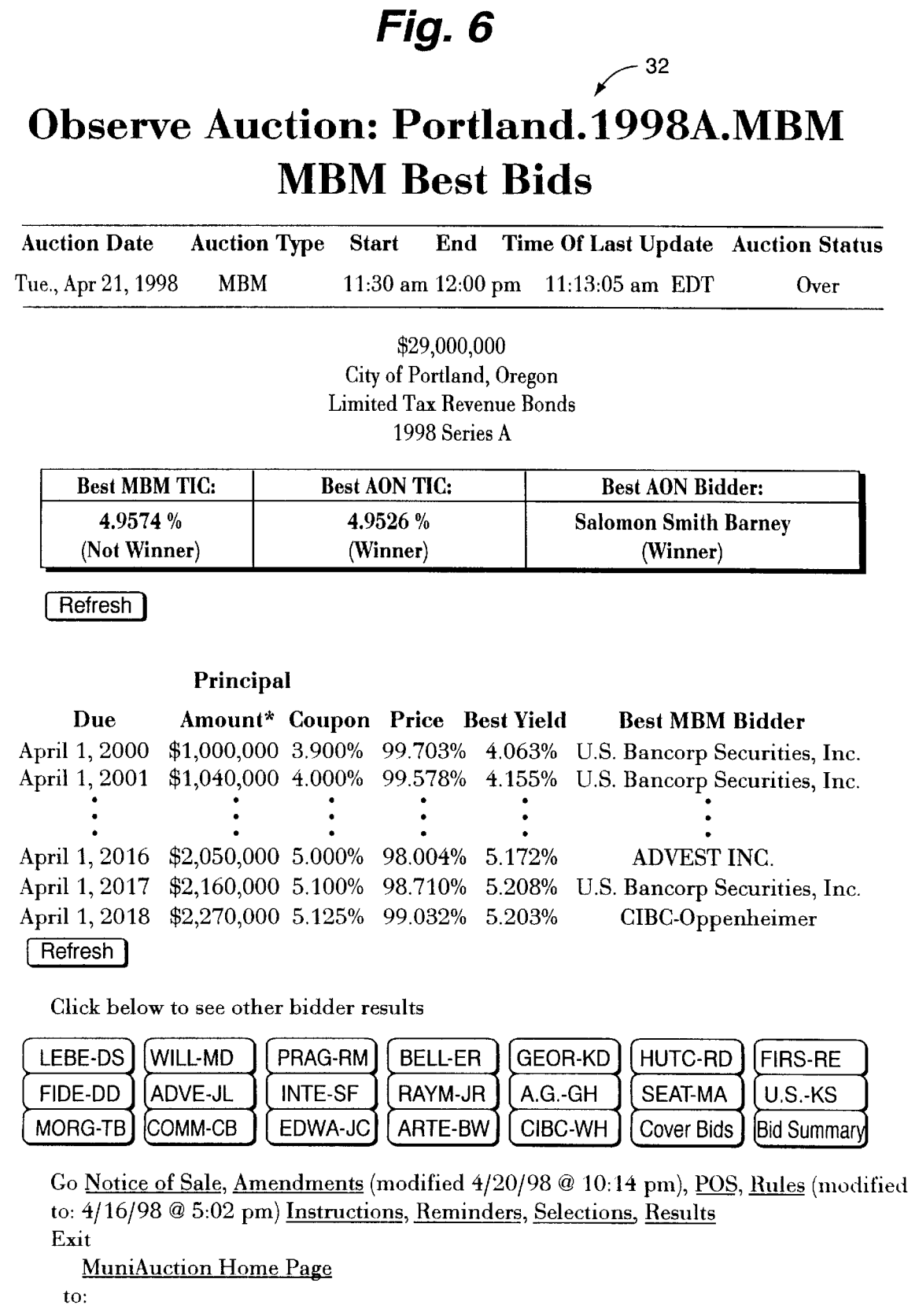

Observe Auction: Portland.1998A.MBM
MBM Best Bids

| Auction Date | Auction Type | Start | End | Time Of Last Update | Auction Status |
|---|---|---|---|---|---|
| Tue., Apr 21, 1998 | MBM | 11:30 am | 12:00 pm | 11:13:05 am EDT | Over |

$29,000,000
City of Portland, Oregon
Limited Tax Revenue Bonds
1998 Series A

| Best MBM TIC: | Best AON TIC: | Best AON Bidder: |
|---|---|---|
| 4.9574 % (Not Winner) | 4.9526 % (Winner) | Salomon Smith Barney (Winner) |

[Refresh]

| Due | Principal Amount* | Coupon | Price | Best Yield | Best MBM Bidder |
|---|---|---|---|---|---|
| April 1, 2000 | $1,000,000 | 3.900% | 99.703% | 4.063% | U.S. Bancorp Securities, Inc. |
| April 1, 2001 | $1,040,000 | 4.000% | 99.578% | 4.155% | U.S. Bancorp Securities, Inc. |
| ⋮ | ⋮ | ⋮ | ⋮ | ⋮ | ⋮ |
| April 1, 2016 | $2,050,000 | 5.000% | 98.004% | 5.172% | ADVEST INC. |
| April 1, 2017 | $2,160,000 | 5.100% | 98.710% | 5.208% | U.S. Bancorp Securities, Inc. |
| April 1, 2018 | $2,270,000 | 5.125% | 99.032% | 5.203% | CIBC-Oppenheimer |

[Refresh]

Click below to see other bidder results

| | | | | | | |
|---|---|---|---|---|---|---|
| LEBE-DS | WILL-MD | PRAG-RM | BELL-ER | GEOR-KD | HUTC-RD | FIRS-RE |
| FIDE-DD | ADVE-JL | INTE-SF | RAYM-JR | A.G.-GH | SEAT-MA | U.S.-KS |
| MORG-TB | COMM-CB | EDWA-JC | ARTE-BW | CIBC-WH | Cover Bids | Bid Summary |

Go Notice of Sale, Amendments (modified 4/20/98 @ 10:14 pm), POS, Rules (modified to: 4/16/98 @ 5:02 pm) Instructions, Reminders, Selections, Results
Exit
MuniAuction Home Page
to:

Fig. 7

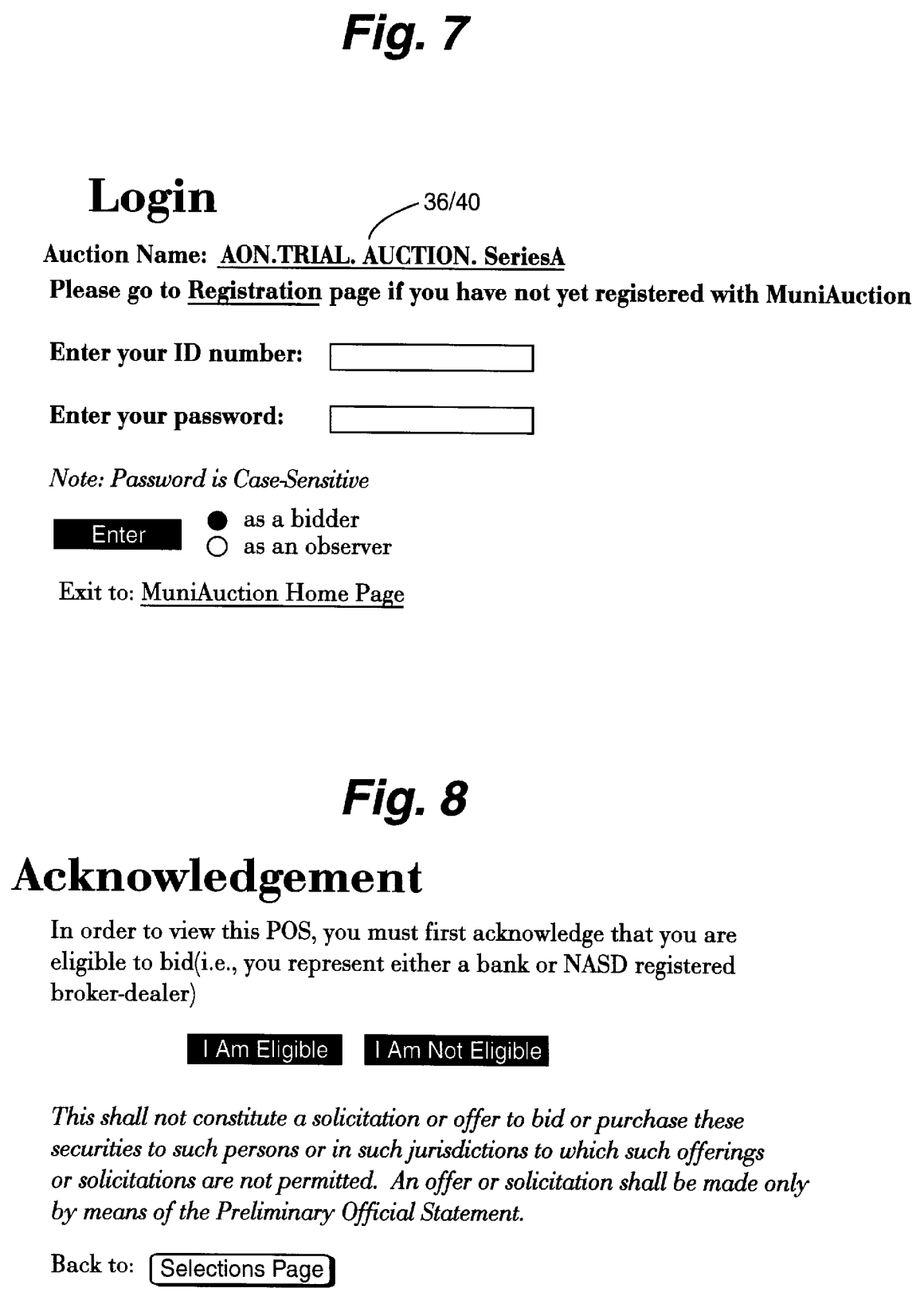

Login

36/40

Auction Name: AON.TRIAL. AUCTION. SeriesA

Please go to Registration page if you have not yet registered with MuniAuction

Enter your ID number: [ ]

Enter your password: [ ]

*Note: Password is Case-Sensitive*

Enter ● as a bidder ○ as an observer

Exit to: MuniAuction Home Page

Fig. 8

Acknowledgement

In order to view this POS, you must first acknowledge that you are eligible to bid(i.e., you represent either a bank or NASD registered broker-dealer)

I Am Eligible I Am Not Eligible

*This shall not constitute a solicitation or offer to bid or purchase these securities to such persons or in such jurisdictions to which such offerings or solicitations are not permitted. An offer or solicitation shall be made only by means of the Preliminary Official Statement.*

Back to: Selections Page

Verification

Your name is Edward Pencoske.
Your firm is Thorp Reed & Armstrong.
This auction is AON.TRIAL.AUCTION.1998A.
This auction is an All-Or-None auction.

Please verify that the above information is correct.

○ YES ○ NO

Have you read the Notice of Sale and related Amendments (modified 4/20/98 @10:14 pm), if any, and do you agree to abide by the terms and conditions?

○ YES ○ NO

Have you read the Preliminary Official Statement?

○ YES ○ NO

Have you read the Rules of MuniAuction (modified 4/16/98 @5:01 pm) and do you agree to abide by them?

○ YES ○ NO

[Enter Auction]

Go Notice of Sale, Amendments (modified 4/20/98 @10:14 pm), POS, Rules (modified to: 4/16/98 @5:01 pm) Instructions, Reminders, Selections, Results Exit to: MuniAuction Home Page

Auction 56

| Auction Date | Auction Type | Start | End | Time of Last Update | Auction Status |
|---|---|---|---|---|---|
| Mon., Feb 23, 1998 | MBM | 9:30 am | 10:00 am | 3:10:16 pm | Over |

$91,760,000*
The Pittsburgh Water and Sewer Authority, Pennsylvania
Water and Sewer System First Lien Revenue Bonds,
Series A of 1998

Name of firm submitting bid: MuniAuction, Inc.

This auction is competing with Pittsburgh Water and Sewer.SeriesA.AON.

70 →

| As of 3:10:16pm, bids have been submitted for all maturities. | ☐☐☐☐☐☐ | 74 |

72 →

| Calculate/Update | IMPORTANT: Bidders must click the 'Calculate/Update' button frequently during auction to update 'Time of Last Update'. Also, clicking 'Calculate/Update' does not result in bid submission. | Submit Bid |

| 68 Due | 66 Principal Amount* | Coupon | Enter Either: Purchase Price | OR | Yield-to Maturity | 70 Your Status | 76 Submitted Cpn-PP-YTM |
|---|---|---|---|---|---|---|---|
| September 01, 2017 | $8,275,000 | % | % | OR | % | Not Winner | |
| September 01, 2018 | $8,695,000 | % | % | OR | % | Not Winner | |
| ⋮ | ⋮ | ⋮ | ⋮ | ⋮ | ⋮ | ⋮ | |
| September 01, 2025 | $12,370,000 | % | % | OR | % | Not Winner | |

| | IMPORTANT: Bidders must click the 'Calculate/Update' button frequently during auction to update 'Time of Last Update'. Also, clicking 'Calculate/Update' does not result in bid submission. | |

Go to: Notice of Sale, Amendments modified 2/20/98 @ 11:23am, POS, Rules modified 2/2/98 @ 11:40am Instructions, Reminders, Selections Exit to: MuniAuction Home Page

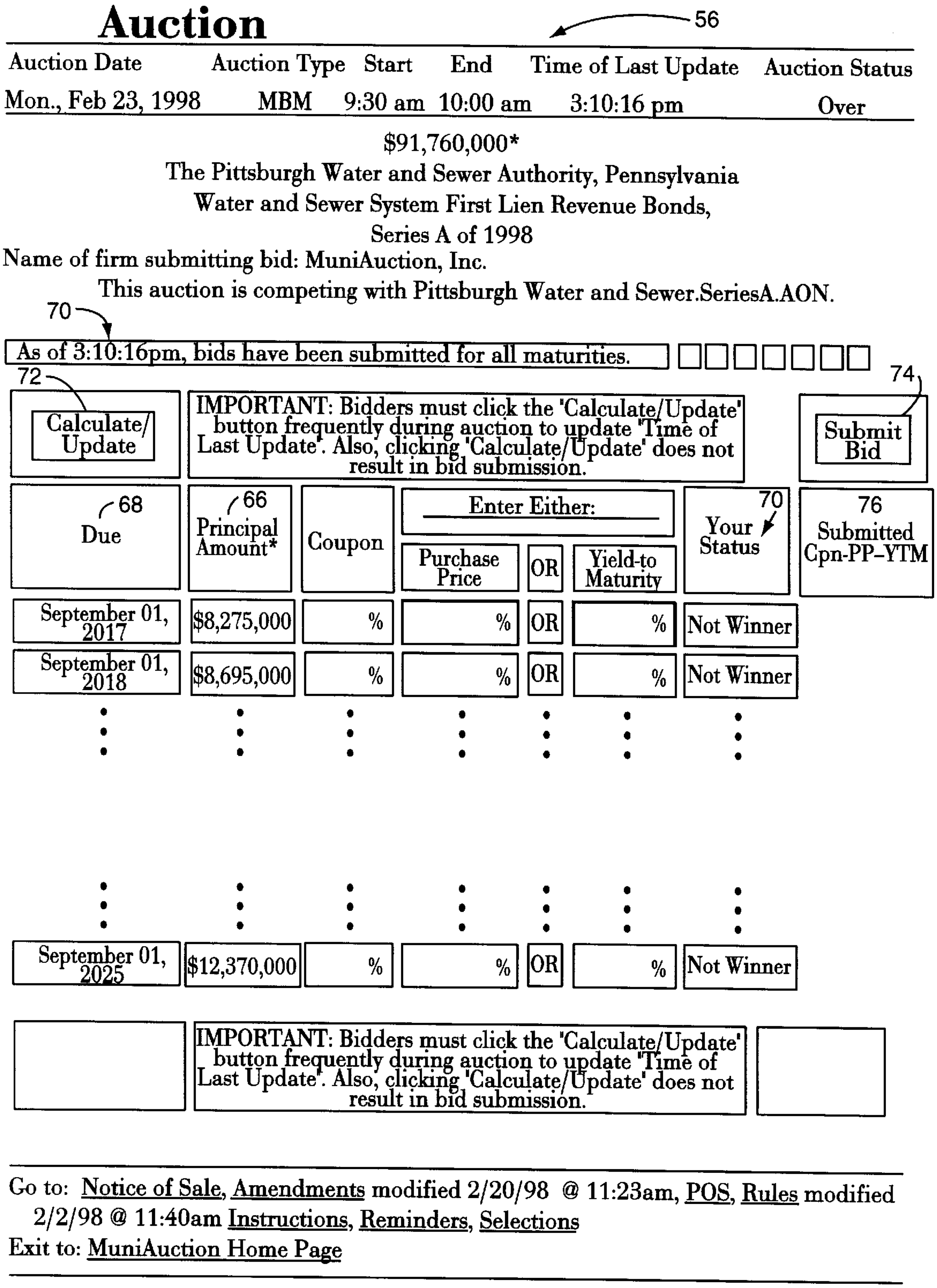

Fig. 10

Auction                                    — 56

| Auction Date | Auction Type | Start | End | Time of Last Update | Auction Status |
|---|---|---|---|---|---|
| Mon., Feb 23, 1998 | AON | 9:30 am | 10:00 am | 3:08:28 pm | Over |

$91,760,000*
The Pittsburgh Water and Sewer Authority, Pennsylvania
Water and Sewer System First Lien Revenue Bonds,
Series A of 1998

Name of firm submitting bid: MuniAuction, Inc.

Purchase Price: $ [ _____ ] — 77
(not to be less than $89,466,000.00)

— 76
Your TIC: NO BID   Your Status: Not Winner

70 — This auction is competing with Pittsburgh Water and Sewer.SeriesA.MBM.

As of 3:08:28 pm, there has been at least one all-or-none bid submitted in this auction.

72 —

| Calculate/Update | IMPORTANT: Bidders must click the 'Calculate/Update' button frequently during auction to update "Time of Last Update'. Also, clicking 'Calculate/Update' does not result in bid submission. | Submit Bid — 74 |
|---|---|---|

| 68 Due | 66 Principal Amount* | Serial/ Sinker Term | Coupon | Enter Either: Reoffering Price | OR | Yield-to-Maturity |
|---|---|---|---|---|---|---|
| September 01, 2017 | $8,275,000 | Serial ▼ | % | % | OR | % |
| September 01, 2018 | $8,695,000 | Serial ▼ | % | % | OR | % |
| ⋮ | ⋮ | ⋮ | ⋮ | ⋮ | ⋮ | ⋮ |
| September 01, 2025 | $12,370,000 | Serial ▼ | % | % | OR | % |

| | IMPORTANT: Bidders must click the 'Calculate/Update' button frequently during auction to update "Time of Last Update'. Also, clicking 'Calculate/Update' does not result in bid submission. | |
|---|---|---|

Go to: Notice of Sale, Amendments modified 2/20/98 @ 11:23am, POS, Rules modified 2/20/98 @ 11:40am Instructions, Reminders, Selections
Exit to: MuniAuction Home Page

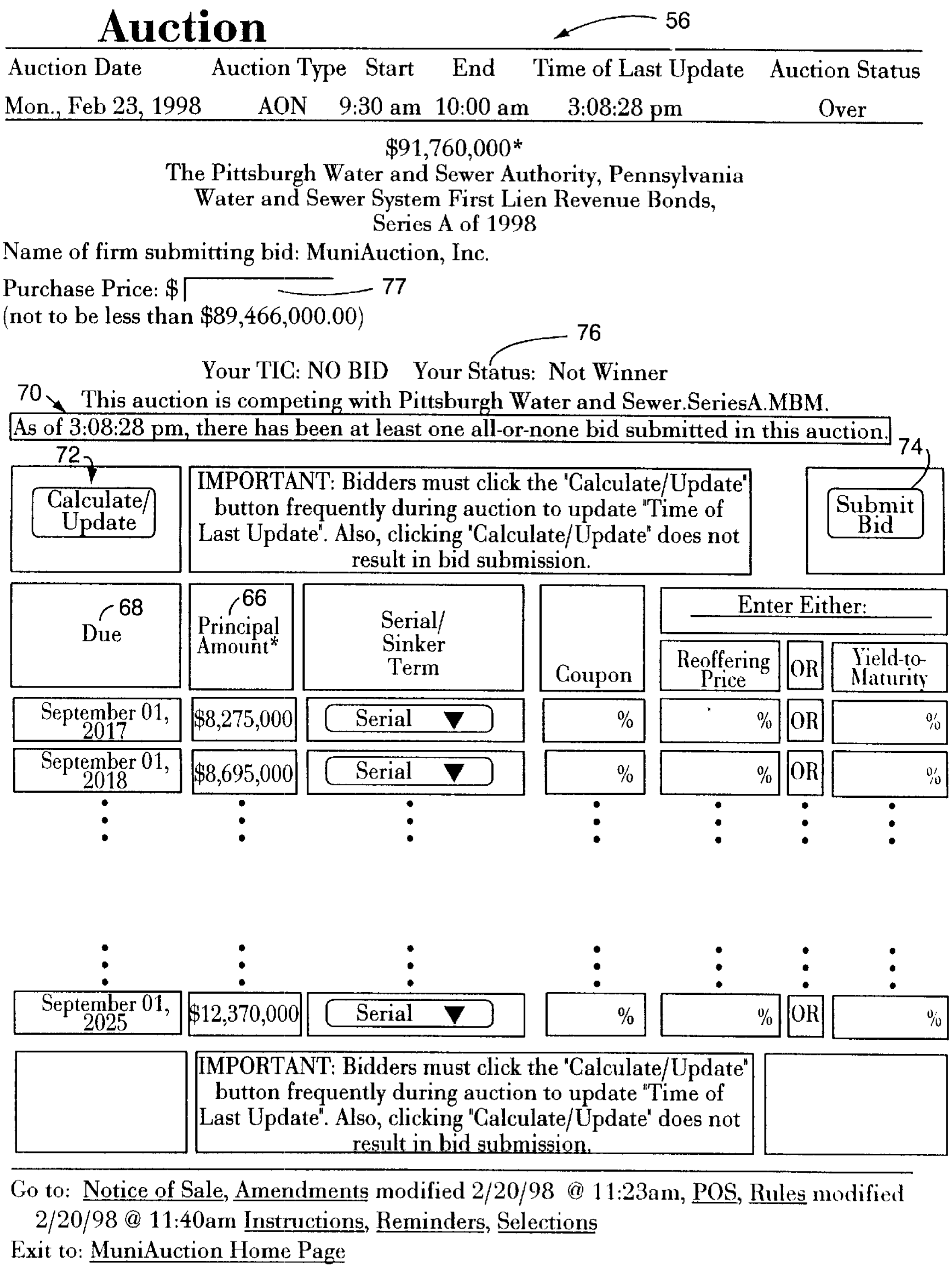

*Fig. 11*

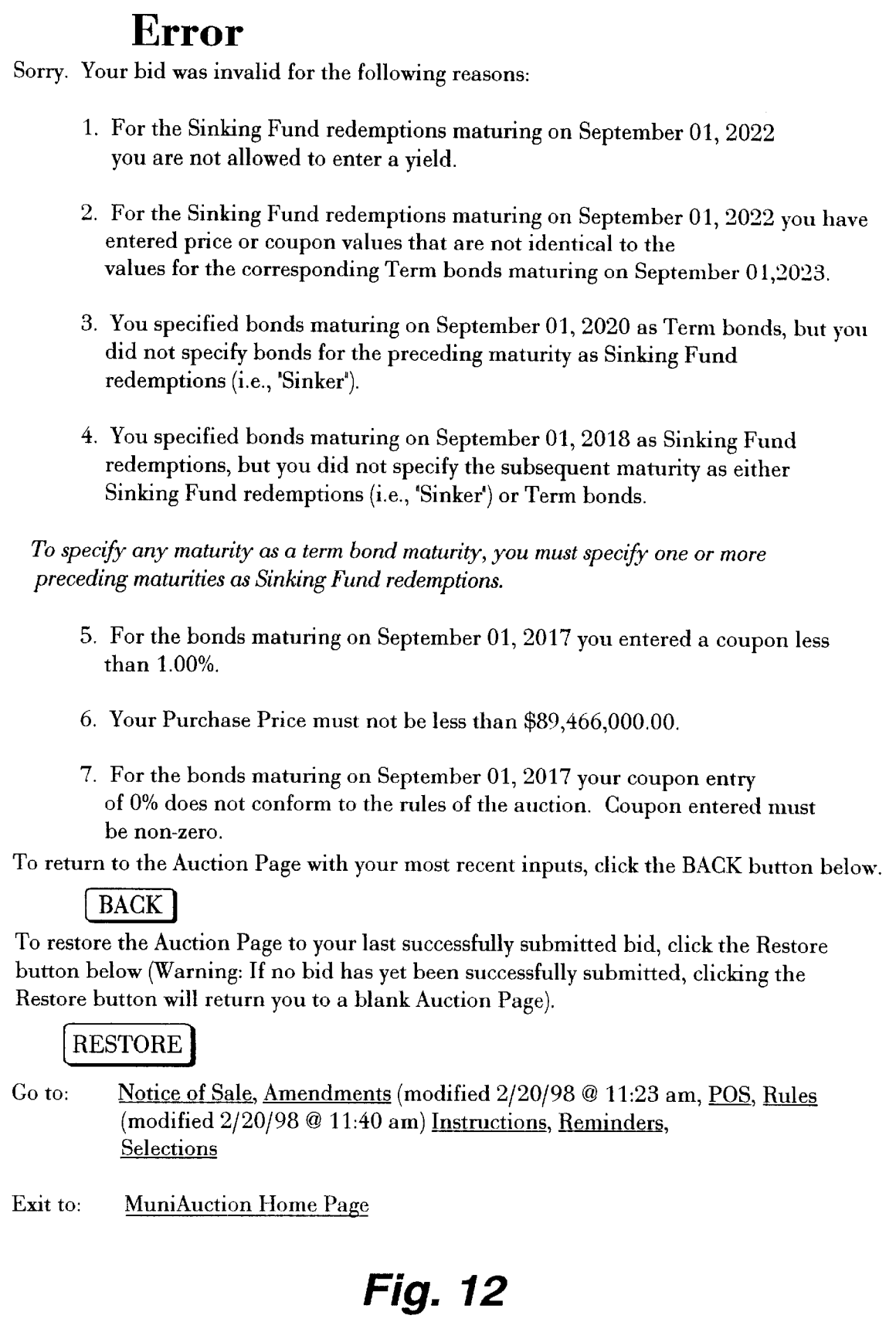

Error

Sorry. Your bid was invalid for the following reasons:

1. For the Sinking Fund redemptions maturing on September 01, 2022 you are not allowed to enter a yield.

2. For the Sinking Fund redemptions maturing on September 01, 2022 you have entered price or coupon values that are not identical to the values for the corresponding Term bonds maturing on September 01,2023.

3. You specified bonds maturing on September 01, 2020 as Term bonds, but you did not specify bonds for the preceding maturity as Sinking Fund redemptions (i.e., "Sinker").

4. You specified bonds maturing on September 01, 2018 as Sinking Fund redemptions, but you did not specify the subsequent maturity as either Sinking Fund redemptions (i.e., "Sinker") or Term bonds.

*To specify any maturity as a term bond maturity, you must specify one or more preceding maturities as Sinking Fund redemptions.*

5. For the bonds maturing on September 01, 2017 you entered a coupon less than 1.00%.

6. Your Purchase Price must not be less than $89,466,000.00.

7. For the bonds maturing on September 01, 2017 your coupon entry of 0% does not conform to the rules of the auction. Coupon entered must be non-zero.

To return to the Auction Page with your most recent inputs, click the BACK button below.

[BACK]

To restore the Auction Page to your last successfully submitted bid, click the Restore button below (Warning: If no bid has yet been successfully submitted, clicking the Restore button will return you to a blank Auction Page).

[RESTORE]

Go to: Notice of Sale, Amendments (modified 2/20/98 @ 11:23 am, POS, Rules (modified 2/20/98 @ 11:40 am) Instructions, Reminders, Selections Exit to: MuniAuction Home Page

*Fig. 12*

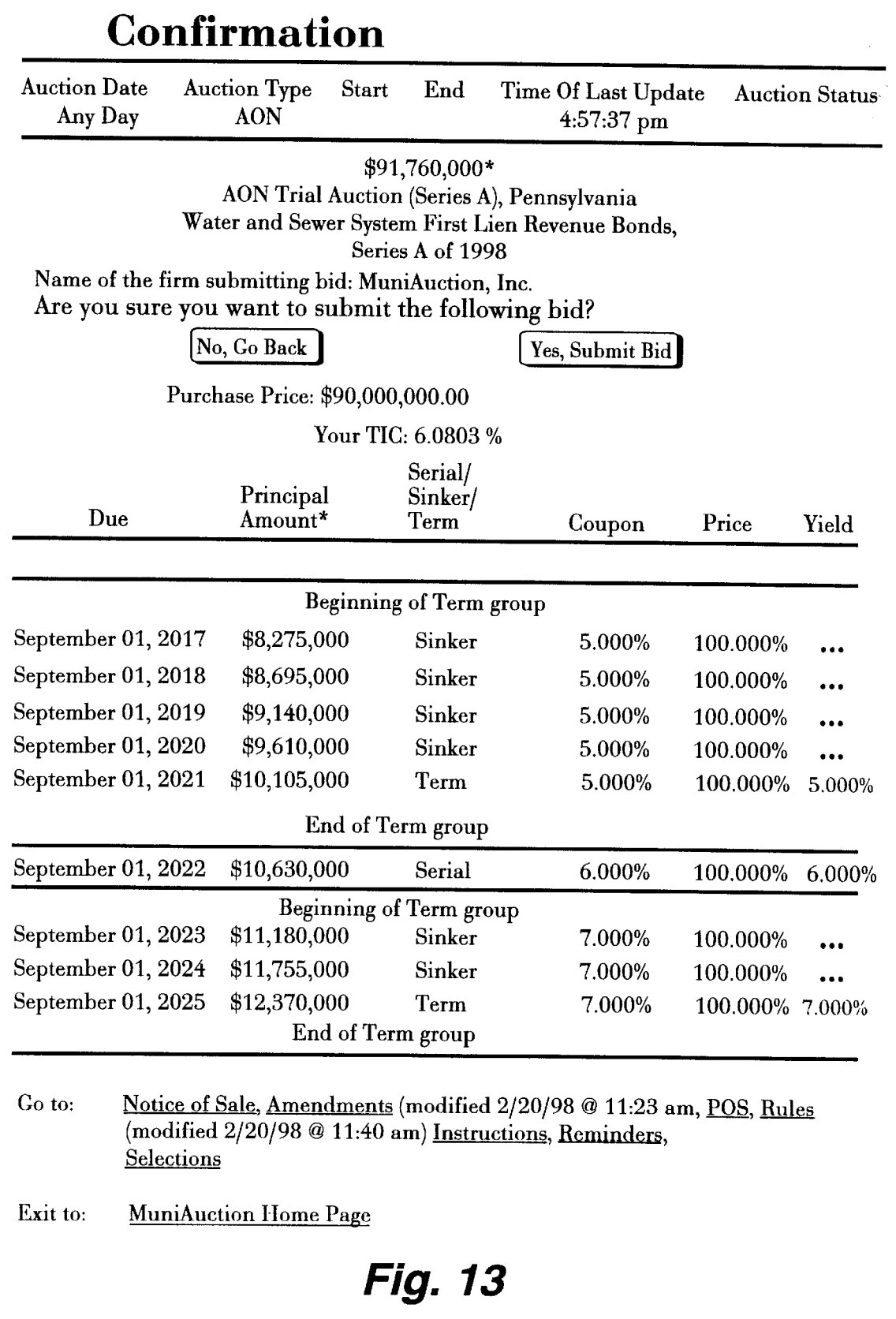

Confirmation

| Auction Date | Auction Type | Start | End | Time Of Last Update | Auction Status |
|---|---|---|---|---|---|
| Any Day | AON | | | 4:57:37 pm | |

$91,760,000*
AON Trial Auction (Series A), Pennsylvania
Water and Sewer System First Lien Revenue Bonds,
Series A of 1998

Name of the firm submitting bid: MuniAuction, Inc.
Are you sure you want to submit the following bid?

[No, Go Back] [Yes, Submit Bid]

Purchase Price: $90,000,000.00

Your TIC: 6.0803 %

| Due | Principal Amount* | Serial/ Sinker/ Term | Coupon | Price | Yield |
|---|---|---|---|---|---|
| | | Beginning of Term group | | | |
| September 01, 2017 | $8,275,000 | Sinker | 5.000% | 100.000% | ... |
| September 01, 2018 | $8,695,000 | Sinker | 5.000% | 100.000% | ... |
| September 01, 2019 | $9,140,000 | Sinker | 5.000% | 100.000% | ... |
| September 01, 2020 | $9,610,000 | Sinker | 5.000% | 100.000% | ... |
| September 01, 2021 | $10,105,000 | Term | 5.000% | 100.000% | 5.000% |
| | | End of Term group | | | |
| September 01, 2022 | $10,630,000 | Serial | 6.000% | 100.000% | 6.000% |
| | | Beginning of Term group | | | |
| September 01, 2023 | $11,180,000 | Sinker | 7.000% | 100.000% | ... |
| September 01, 2024 | $11,755,000 | Sinker | 7.000% | 100.000% | ... |
| September 01, 2025 | $12,370,000 | Term | 7.000% | 100.000% | 7.000% |
| | | End of Term group | | | |

Go to: Notice of Sale, Amendments (modified 2/20/98 @ 11:23 am, POS, Rules (modified 2/20/98 @ 11:40 am) Instructions, Reminders, Selections Exit to: MuniAuction Home Page

*Fig. 13*

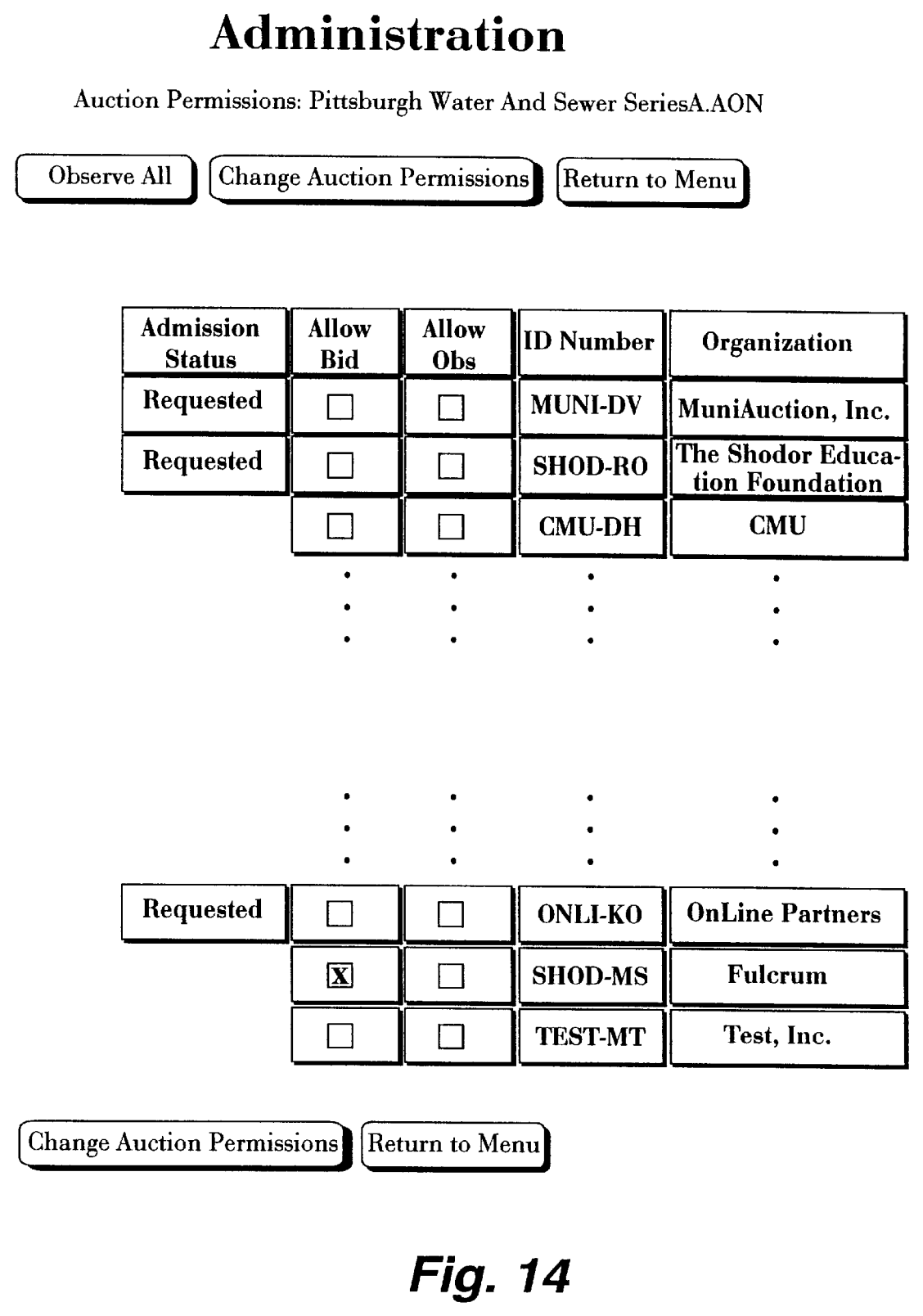

Administration

Auction Permissions: Pittsburgh Water And Sewer SeriesA.AON

[Observe All] [Change Auction Permissions] [Return to Menu]

| Admission Status | Allow Bid | Allow Obs | ID Number | Organization |
|---|---|---|---|---|
| Requested | ☐ | ☐ | MUNI-DV | MuniAuction, Inc. |
| Requested | ☐ | ☐ | SHOD-RO | The Shodor Education Foundation |
| | ☐ | ☐ | CMU-DH | CMU |
| | ⋮ | ⋮ | ⋮ | ⋮ |
| | ⋮ | ⋮ | ⋮ | ⋮ |
| Requested | ☐ | ☐ | ONLI-KO | OnLine Partners |
| | ☒ | ☐ | SHOD-MS | Fulcrum |
| | ☐ | ☐ | TEST-MT | Test, Inc. |

[Change Auction Permissions] [Return to Menu]

*Fig. 14*

Administration

Create New Auction

Date of Auction:
Month [January ▼] Day   Year

Start time: [  ]:[  ]   End time: [  ]:[  ]

Settlement Date:
Month [January ▼] Day   Year

Dated Date:
Month [January ▼] Day   Year

Date of First Interest payment:
Month [January ▼] Day   Year

First Optional Call Date:
Month [January ▼] Day   Year

Good Faith Deposit: $[        ]

Clearing Agent Fee:      [   ] costs per $1,000 bond
Overnight Loan Charges: [   ] costs per $1,000 bond

| Auction Type |
|---|
| O Trial Auction<br>O Live Auction |
| Options: |
| O All-or-None<br>   Minimum Allowable Purchase Price:[   ] %<br>   O Allow Serials/Sinkers/Terms<br>   O Allow Serials Only<br>O Maturity-by-Maturity |
| O Display Best TIC/Yield and Status<br>O Display Status but Hide Best TIC/Yield<br>O Hide Best TIC/Yield and Status |
| Auction Bidding Method:<br>   O Coupon and Price<br>   O Coupon And Yield<br>   O Coupon and Price or Yield |
| Competition<br>   O No Competition.<br>   O This auction will compare with: |
| Bid Restrictions: |
| Single Bid<br>Multiple Bids |

| |
|---|
| Maximum Allowable Reoffering Price [  ]%<br>Minimum Allowable Reoffering Price [  ]% |
| Maximum Allowable Coupon [  ]%<br>Minimum Allowable Coupon [  ]% |
| Ascending Yields Required<br>Ascending Yields Not Required |
| Zero Coupons Allowed<br>Zero Coupons Not Allowed<br>Zero Coupons Required<br>   Total to Display:[   ] |
| No restrictions on coupons<br>Coupons must be multiples of:<br>   1/8th of 1%<br>   1/20th of 1%<br>   Either 1/8th or 1/20th of 1% |
| Allow All bids<br>Allow Better Bid Only |

Number of maturities to [   ]
be offered:

Auction names:[         ]

Issuer: [         ]

County (If applicable):[     ]

State:

Auction Description:

[                    ]

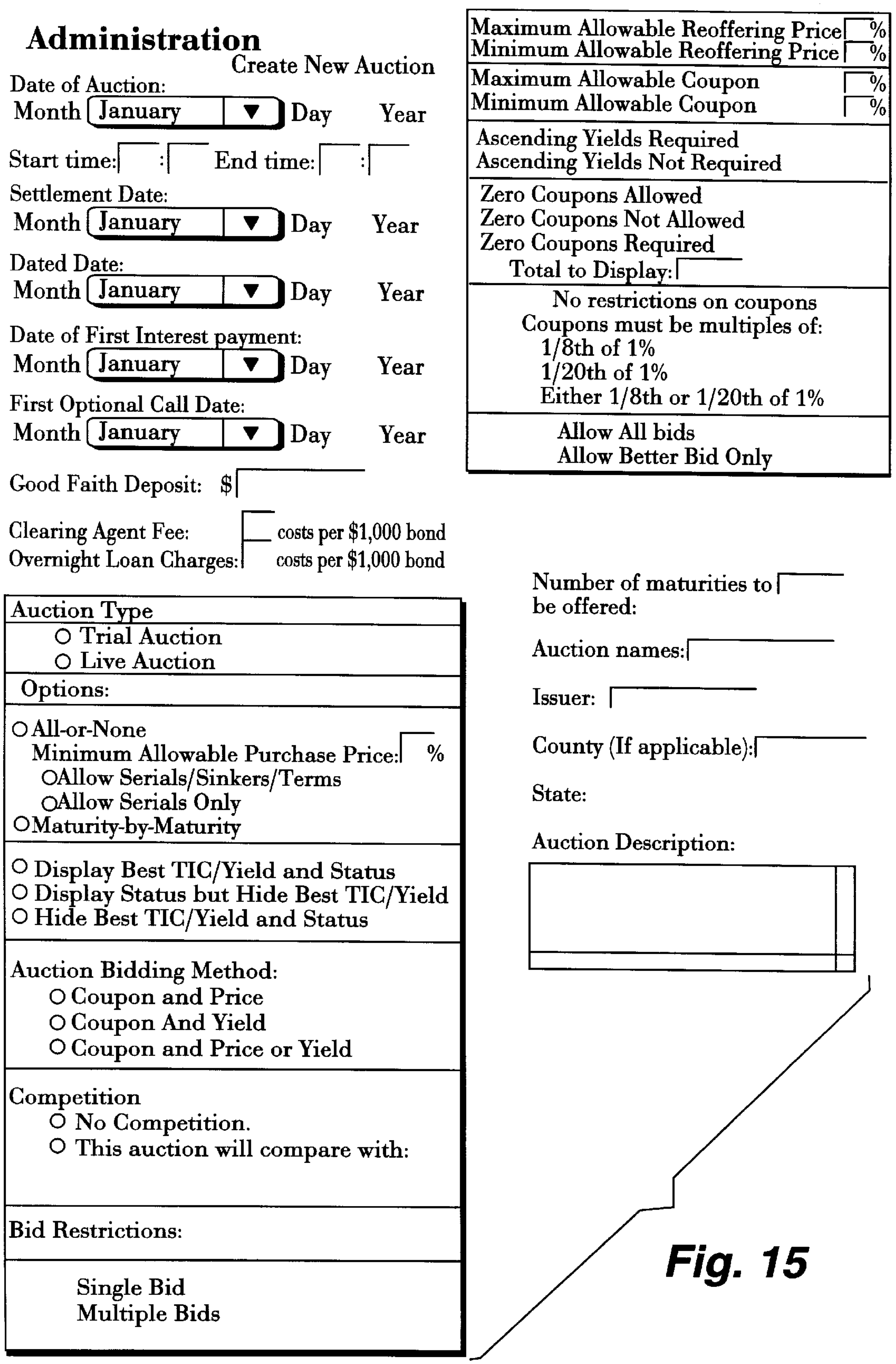

*Fig. 15*

PROCESS AND APPARATUS FOR CONDUCTING AUCTIONS OVER ELECTRONIC NETWORKS

This application claims the benefit under 35 U.S.C. § 119(e) of copending provisional application Ser. No. 60/047,876 entitled "PROCESS FOR CONDUCTING AUCTIONS OVER ELECTRONIC NETWORKS" filed May 29, 1997, which is incorporated herein by reference.

BACKGROUND OF THE INVENTION

1. Field of the Invention

The present invention relates to a method of conducting auctions, particularly original issuer municipal bond auctions, over electronic networks, particularly the Internet.

2. Description of the Prior Art

A conventional auction is a prior art process in which bids from bidders are received by an auctioneer for an item to be sold. The bidder whose bid is the highest at the termination of the auction (the "successful bidder") becomes the purchaser of the item.

Auctions may be conducted in a variety of ways. In the "silent real-time" auctions bidders are made aware at all times of the magnitude of the current highest bid but do not know the identity of the highest bidder. So long as the auction is still in progress, the bidders may increase their bids. Silent real-time auctions generally end at a specific announced time and any bid submitted by that time is considered in determining the successful bidder.

Another style is the "public real-time" auction, in which bidders are made aware both of the current highest bid and the identity of the bidder. Public real-time auctions are conventionally held by open verbal outcry and are terminated by the fall of the auctioneer's hammer after warning is given to the bidders of the imminent close of the auction.

Other types of auctions are known. In a sealed-bid auction, bidders are given the chance to make only one secret bid. They do not know either the current highest bid or the identity of the current highest bidder. In a "silent and blind auction" the specific bids and identity of the bidders is maintained in secret until close of the auction. Yet other types of auctions differ from the foregoing in that offers to sell may be made by the auctioneer in decreasing price increments, the first buyer to accept a bid being the winner. This type of auction is also known as a "Dutch flower auction." In another type, the winner is the party who makes the highest bid, but he pays the amount bid by the second-highest bidder. Many variations on these auctions are also known.

It is a drawback of the above types of auctions that the bidders must either gather together in the same physical location with the auctioneer or remain in contact with the auctioneer by telephone or video conference facility. Bidders who are in the physical presence of the auctioneer may have an advantage because they are able to respond to the auctioneer's reaction to a bid more rapidly than those at remote locations are.

A variety of electronic-auctioning and trading systems have been developed, including electronic auction systems relating to financial instruments. Examples of these can be seen in U.S. Pat. No. 5,640,569 to Miller et al, U.S. Pat. No. 5,375,055 to Togher et al, U.S. Pat. No. 5,243,515 to Lee, U.S. Pat. Nos. 5,136,501 and 5,077,665 to Silverman, et al, U.S. Pat. Nos. 4,980,826 and 4,903,201 to Wagner, U.S. Pat. No. 4,789,928 to Fujisaki and U.S. Pat. No. 3,581,072 to Nymeyer.

The Miller patent is directed to an electronic "auctioning" system specifically directed to allocating computer resources such as transmission bandwidth of a multiplicity of network links interconnecting the users. The system uses a type of second price sealed bid method. The system allocates resources to maximum declared values based upon the second highest bid such that successful bidders are charged what is referred to as an opportunity costs for the goods.

The Togher et al patent discloses a credit management system for an electronic brokerage system. The brokerage system disclosed involves a communications network for facilitating the buying and selling of large blocks of foreign currency. In particular the system provides that each bid or offer for bid for a particular type of financial instrument is prescreened by the system for compatibility with limited credit information. The system identifies that, at least in currency, the resulting price may be based upon a composite of bids for small sizes or lots of the currency in question.

The Lee patent discloses a secure teleprocessing bidding system relating to a secret bidding process. The system maintains the bids secret from other bidders until after the period for bidding is closed. The system is intended to eliminate bid procedure violations and provides an electronic record of the bids received.

The Silverman et al patents disclose an electronic trade matching system for trading instruments in which bids are automatically matched against offers for the given trading instruments. The system uses a network to connect the host computer with bidding and offering clients of the system.

The Wagner patents disclose a voice actuated futures trading exchange. The system is described as a computerized public outcry exchange system for transacting sales of a particular futures commodity contract by members of a futures trading exchange wherein bids to purchase or offers to sell the particular commodity are made by members through remote terminals and the exchange computer automatically matches offers and bids to complete the transaction. The system provides that the offers may be orally entered into the system.

The Fujisaki patent discloses an auction information transmission processing system that sets up a hierarchical system of host and server computers, which are configured to minimize the data transmitted between computers during an auction. The system is designed to allow auction participants to be spread out over a wide area. The system was directed to auctioning of specific items such as used cars.

None of the above described patents are directed to original issuer auctions of financial instruments. With auctions of various financial instruments there is a significant difference between the original issuer and subsequent resale of portions of this instrument in the secondary market. Once in the secondary market the financial instrument or portions thereof become fungible commodities appropriate for trading in various trading forums including some of the electronic trading systems described above. The present invention is directed to original issuer auctions, which involve distinctly different issues than those associated with the secondary market.

None of the existing electronic trading or auctioning systems addresses the needs of original issuer auctions of financial instruments, such as municipal bonds. In the domain of original issuer municipal bond auctions, conventionally competitive bids for new municipal bond offerings are submitted to the issuer via fax machine or US mail or in person and qualified bids must be for all of the bonds in the issue ("all-or-none"). In addition to fax submissions, 21$^{st}$ Century Municipals, Inc. has developed a modem based electronic bid submission system using a computer network and sold under the trademark PARITY. The PARITY bid submission system allows bidders who have previously obtained and installed appropriate software to electronically submit bids in an auction over a computer network. The PARITY system is designed to be used together with fax and other bid submission methods during an auction. The PARITY system is designed as a sealed bid system such that the bids received are not reviewed until after the auction closes, and there is no feedback to the bidders during the auction.

In a conventional original issuer municipal bond auction, there is a fixed time (e.g. 10:30 a.m., EST) on a predetermined date ("sale date") that bids must be delivered to the issuer. Because bidders are sensitive to on-going interest rate movements in the capital markets while preparing their bid, they prefer to wait until the last minute before submitting the bid to be as competitive as possible and avoid the risk that other bidders will learn the details of their bid before the deadline. This system essentially mimics a sealed bid arrangement in this respect.

It is a drawback of bids submitted by mail that the bids must be submitted too far in advance to competitively reflect the market conditions when the bid is due.

It is a drawback of fax auction methods that faxed bids are transmitted after the deadline, fax clocks are not set properly and record the incorrect time in fax headers, fax transmission interruptions outside the control of the sender and receiver and machine malfunctions such as paper misfeeds occur.

It is a drawback of in-person bidding methods that bidders have difficulty locating the place where bids are to be delivered or may experience traffic or other delays in submitting bids. Also, because the most frequent participants in competitive bids for new issues are located in New York City and the issuers are in other parts of the country, it is extremely difficult for many bidders to deliver their bids in person.

It is a drawback of the PARITY bid submission system that to use electronic bid submission the bidders must previously obtain and install the appropriate software, resulting in essentially a closed computer network. An additional drawback with the PARITY system is that no feedback is provided to the bidders. The system incorporates all of the drawbacks inherent in these other bid submission systems.

It is a drawback of prior art bidding methods for original issuer auctions of financial instruments that frequently bids are not submitted in conformity with issuers' specifications as set forth in a Notice of Sale or similar solicitation document. It is a drawback of fax bid methods that faxes may not be legible at the receiving end. These problems can create controversy between bidders and embarrass municipal officials and their financial advisors conducting original issuer municipal bond auctions. They can also cost the issuer money (e.g. if the best bid has to be disqualified as a result of one of these malfunctions or mistakes).

Further drawbacks of prior art bidding methods in original issuer municipal bond auctions are:

1. Bidders cannot see bids submitted by other bidders and are thus precluded from using this information to make their bids more competitive;
2. Once having submitted a bid, a bidder is not given an opportunity to correct or improve their bid in the event it does not conform in some way to the issuer's bids specifications;
3. Bidders cannot submit bids for selected bond maturities; bids must be "all-or-none"; meaning they must purchase every single maturity in the issue or none of them;
4. Regional and small underwriters are precluded from submitting bids because they do not have sufficient capital or desire to purchase every maturity in an issue (i.e. all-or-none);
5. Institutional investors and other bidders who are not underwriters do not submit bids because they desire only selected maturities rather than all of the bonds in an issue;
6. There is a delay after bids are submitted and before awarding a contract to the successful bidder because it is necessary for the issuer to transcribe the bids into a computer spreadsheet or other program that computes which bid is the best one; furthermore, it is usually necessary to resize the principal maturity amounts after determining the winning bid, which results in further delays before the sale is made;
7. There is no effective security mechanism to reassure issuers that bids submitted via fax or other method are bona fide offers from qualified bidders;
8. There is no built-in safeguard that alerts bidders before submitting their bid when they attempt to make a bid which does not conform to the issuer's specifications (e.g., exceeding the issuer's premium or discount limitations, interest rate coupons which are not multiples of a predetermined percentage, etc.).

The prior art does not disclose a method of conducting original issuer municipal bond auctions mediated by computer in which the bidders may be distributed in different physical locations yet by which either a silent real-time auction or a public real-time auction may be conducted.

SUMMARY OF THE INVENTION

According to one embodiment, the present invention is directed to a computer implemented process comprised of the steps of: establishing communications over a network between an auctioneer's computer and a plurality of bidders' computers; providing information regarding financial instruments to be sold to potential bidders; submitting at least one of a maturity by maturity bid or an all-or-none bid via the bidder's computer; accepting one or more of the submitted bids; and displaying the current best bid while the auction is in process. Information in addition to the current best bid which may be displayed includes the identity of the bidder, showing the status of a plurality of bidders, or showing a no-bid status on a portion of the financial instrument.

The present invention also provides for selectively displaying selected auction and bid status information during the course of the auction to non-bidding observers of the auction via the network on the observers' computers. This allows for third party observation of the auction in real time. The present invention can selectively provide information concerning the auction to participants and observers from the auctioneer's computer via the network after the closing of the auction.

The present invention also provides for verifying that each bid is in conformance with predetermined bid parameters and gives the bidder an opportunity to review and confirm bids prior to the bids being actually recorded on the auctioneer's computer. The bid verification may include automatically refusing acceptance of submitted bids that do not conform to predetermined bid parameters, and providing feedback to the bidder of a proposed bid by providing the bidder with a summary of the proposed bid prior to bid submission. The present invention also screens bidders via the network to qualify bidders to submit bids and provides documentation of the qualification of the individual bidders.

The present invention includes an electronic bid calculation sheet, which is supplied to the bidder over the network, wherein the electronic bid calculation sheet allows each bidder to prepare proposed bids including calculation of the cost of a proposed bid, and calculation of the various components of that cost including commissions, concessions, etc., prior to submission of the bid. The electronic bid calculation sheet is adapted to selectively display the bidder's last submitted bid without disturbing proposed bid information on the spreadsheet.

The operation of the present invention includes a plurality of computers that are connected to an electronic network, in particular the Internet. Each bidder may use their own personal computer. The bidders' computers are provided with commercially available browser software that communicates through the network with an auctioneer's server. Auction terms and conditions, and a description of the instruments to be auctioned, are broadcast or otherwise made available by the auctioneer's server to the bidders' computers. During the auction the auctioneer's server broadcasts or otherwise makes available selected bid information such as bidder status (i e., leader or not leader), or the current highest bid and, if desired, the identity of the current highest bidder. Software on the server, or perhaps on the bidders' computers in a JAVA implementation, guides the bidders through the bidding process and provides computational assistance in preparing their bids and comparing them to the current highest bid. The bidder may prepare a tentative bid, review it and modify it before submitting it. A confirmation step may be implemented to insure that the bid is correct before it is submitted. When a bid is "submitted", it is compared with the current highest bid. If the submitted bid is higher than the current highest bid, it becomes the new current highest bid and, if desired, is made available to all bidders. At the close of the auction, the auctioneer's computer notifies the bidders' computers of the successful bid. The auctioneer's computer also maintains a database of all bids which can be accessed by interested parties for their own use. Those and other advantages will be clarified in the description of the preferred embodiment together with the attached figures in which like reference numbers represent like elements throughout.

BRIEF DESCRIPTION OF THE DRAWINGS

For the present invention to be easily understood and readily practiced, preferred embodiments will now be described, for purposes of illustration and not limitation, in conjunction with the following figures:

FIG. 5 illustrates an example of a selections page;

FIG. 6 illustrates an example of an observation page;

FIG. 7 illustrates an example of a log-in page;

FIG. 8 illustrates an example of an acknowledgment page;

FIG. 9 illustrates an example of a verification page;

FIGS. 10 and 11 illustrate two examples of bid preparation/submission pages;

FIG. 12 illustrates an example of an error page;

FIG. 13 illustrates an example of a confirmation page; and

FIGS. 14 and 15 illustrate two examples of administration pages.

DETAILED DESCRIPTION OF THE PREFERRED EMBODIMENTS

The present invention concerns original issuer municipal bond auctions in which a municipality ("Issuer") offers its bonds to purchasers, generally underwriters who resell them to the public. The present invention is also applicable to corporate commercial paper, corporate bonds and notes, U.S. Treasury auctions, equity offerings, and, in general, any financial instrument. In a municipal bond auction, the municipality desires to raise the greatest possible amount of money for its bonds and therefore desires a large number of competitive bidders. Bids in municipal bond auctions may be complex because of the need to bid on a package of multiple bonds having differing principal amounts and maturity dates. Comparing one's prospective bid against the current highest bid involves more than a simple comparison of two numbers. It is difficult to do this comparison rationally in real-time without computational assistance.

Bonds are offered to underwriters ("bidders") by means of two official documents prepared by the Issuer: a Notice of Sale and a Preliminary Offering Statement ("POS" or "Prospectus"). The Notice of Sale describes the terms of the offering in detail. The POS describes the bonds being issued in detail, including such terms as the legal authority of the Issuer to issue them, a description of the security being offered to the purchaser, and the like. The terms of both the Notice of Sale and the POS are essential to the preparation of a bidder's bid.

Figure 1:
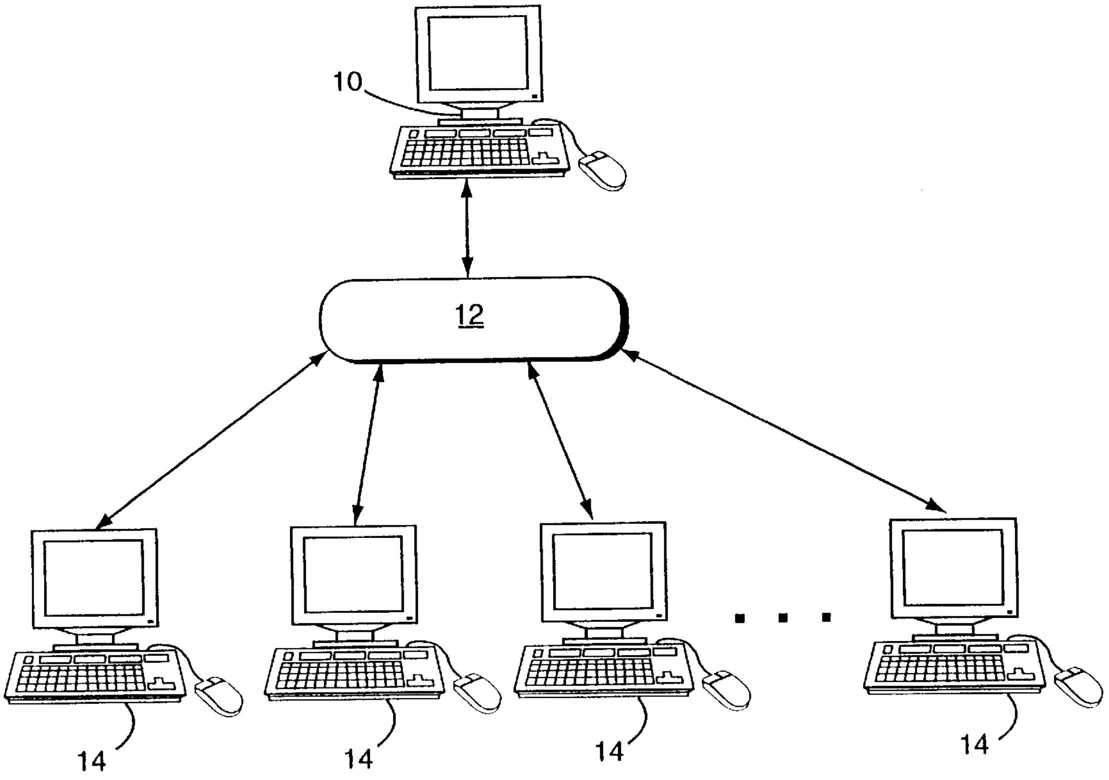
FIG. 1 illustrates a network over which the present invention may be practiced.
Figure 2:
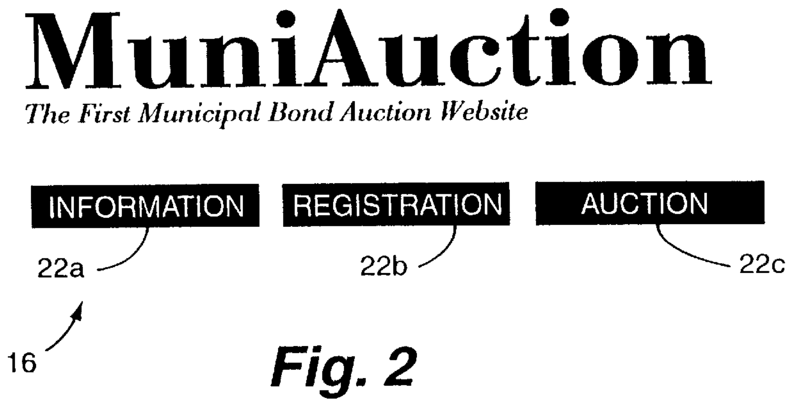
FIG. 2 illustrates an example of a home page from one implementation of the present invention.

In a preferred embodiment, the auction is conducted by an auctioneer hired by the Issuer to solicit and receive bids. As shown schematically in FIG. 1, in a preferred embodiment, the auctioneer is provided with a computer/server 10 connected to a network such as the Internet 12. The auctioneer maintains a web site on the Internet through the server that may be accessed by users. As used herein, the term "user" means any person who accesses the auctioneer's web site, including the auctioneer, bidder, Issuer, Issuer's financial advisor or auction administrator. In a preferred embodiment, each user may use his or her own personal computer 14 connected to the Internet 12. Computers 14 are provided with conventional web browsing software to obtain access to the auctioneer's web site. A portion of one example of the home page 16 of the auctioneer's website is illustrated in FIG. 2.

The user is presented with a series of screens to guide him through the bidding process, illustrative examples of which are shown throughout the figures. In a preferred embodiment, the source code implementing these screens resides entirely in the auctioneer's computer 10 and is downloaded as HTML to the user's computer 14 as each screen is accessed. In an alternative embodiment, portions of the source code implementing certain features remains resident on the user's computer, e.g. in the form of applets written in the JAVA language. In the preferred embodiment, the source code that supports operation of the auctioneer's web site is written in HTML (Hypertext Markup Language), PERL 5, and Mini SQL (Structured Query Language).

In a preferred embodiment, for security reasons each user must either register or make arrangements in advance with the auctioneer to receive an identification number ("ID") to obtain access to auction information and to enter or review bids. Registration is schematically illustrated as elements 18 and 20 in FIG. 3*a*.

The applicant's web site, in particular the home page 16, can be accessed by any interested person using URL http://www.muniauction.com.

The user who "visits" the auctioneer's web site is led through a sequence of web pages and may prepare and submit bids by typing entries and using conventional mouse clicks as in accessing a typical web site.

Figure 3A:
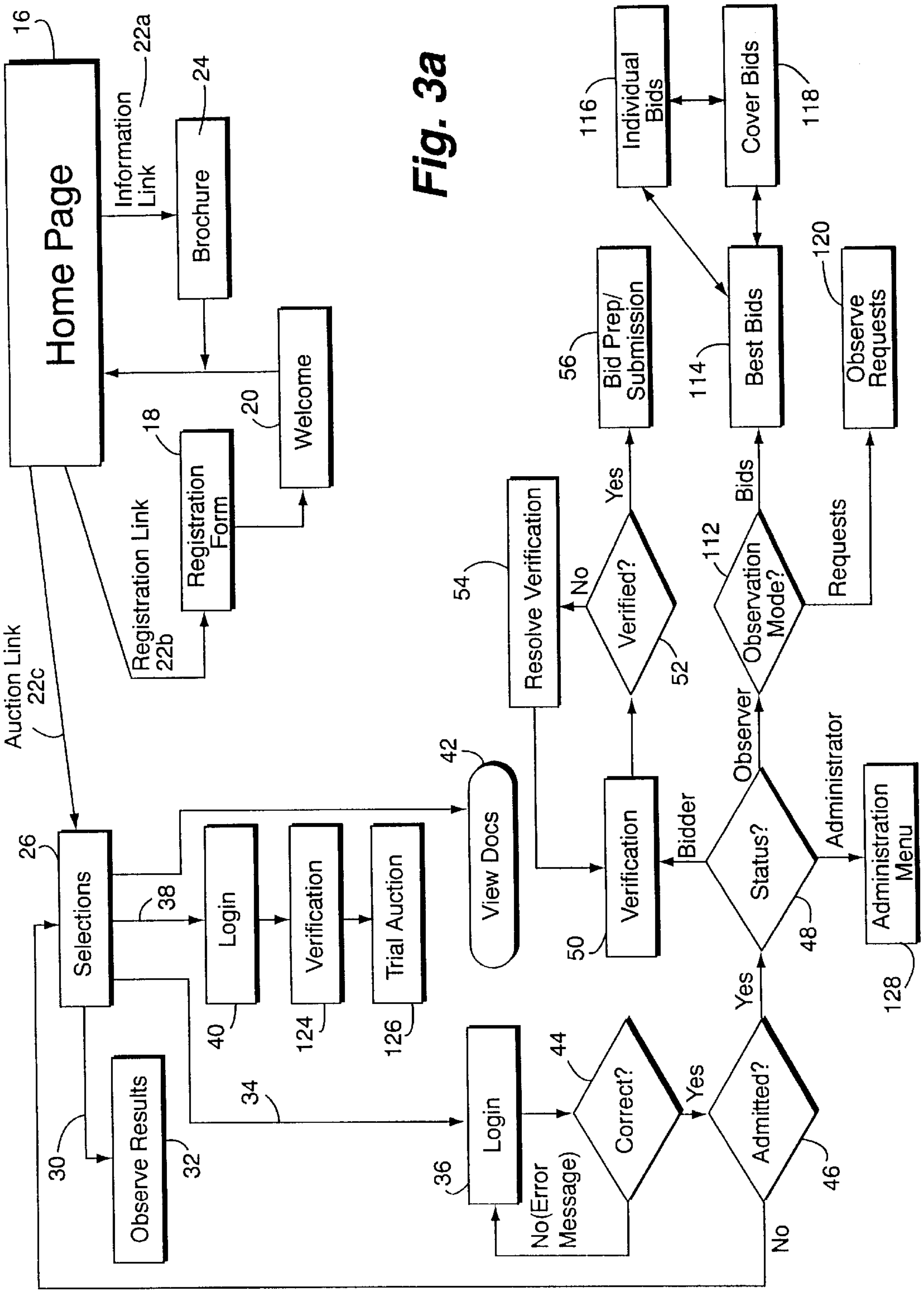
FIG. 3*a* is a flow chart illustrating the overall process flow of the present invention from a home page.

The site's home page 16, shown in FIG. 2, offers three links, an information link 22*a* to brochure 24 (FIG. 3*a*), a registration link 22*b* to registration pages 18, 20 (FIG. 3*a*) and auction link 22*c* to a selections page 26 (FIG. 3*a*).

The "Brochure" pages 24 are a description of the electronic auction, why it is useful, how it works, its benefits to issuers and bidders, special features and where to call for an on-line demonstration.

Figure 4:
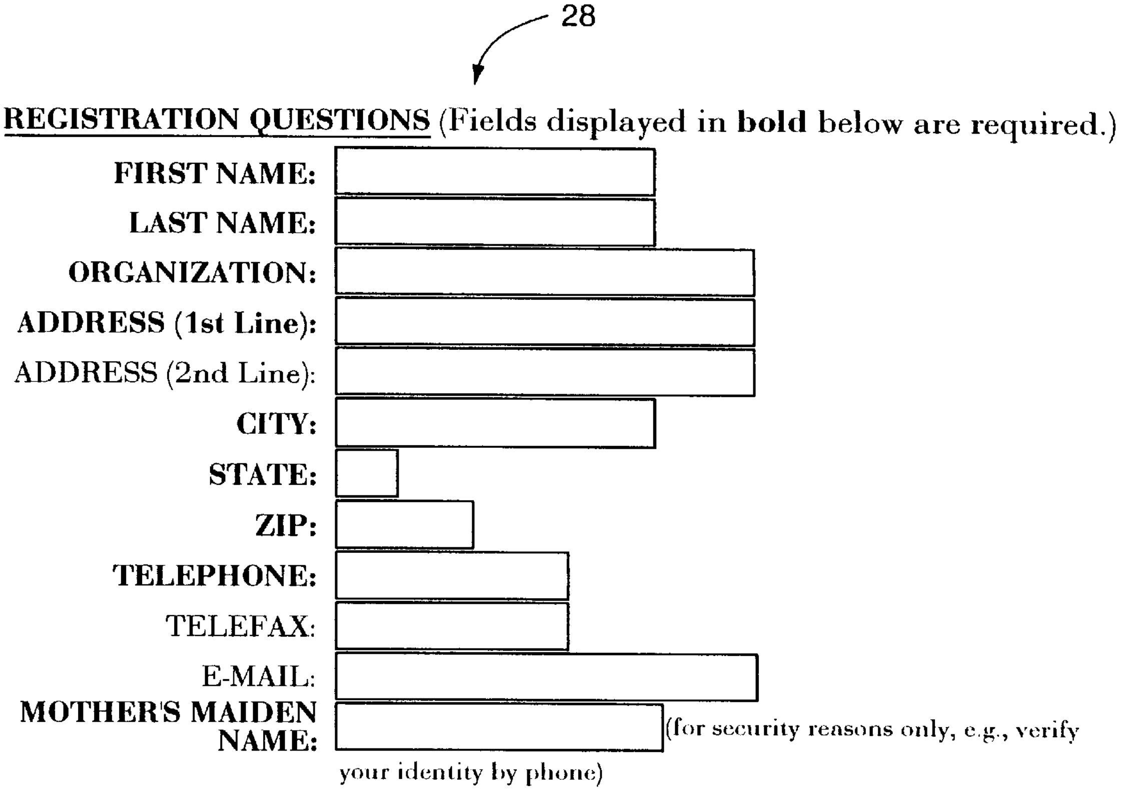
FIG. 4 illustrates a series of questions which may form a portion of the registration process.

The "Registration" pages 18 and 20 contain appropriate forms to be completed by those interested in submitting bids. A portion of a web page 28 shown in FIG. 4 may be part of the registration page 18 shown in FIG. 3*a*. Parties must register so that their credentials can be verified prior to issuance of security information enabling them to make legitimate bids. Registration is necessary to prevent unauthorized persons from interfering with, or obtaining information about, the auction.

The "Auction" link 22*c* of home page 16 leads to the selections page 26 from which a user may enter the auction. An example of the selections page 26 is shown in FIG. 5.

The selections page 26 lists the bond auctions which are either completed, in progress, or anticipated. The auctions may be trial auctions in which users can view and practice bidding or real auctions. The listing may include the name of issuer, the state where the issuer is located, a brief description of the bonds being sold, the size of the issue, the scheduled auction date, and start time. Each possible auction may have a group of selections such as "Enter Action" for auctions upcoming or in progress, "Observe Results" for completed auctions, "View Notice of Sale", View Amendments", and "View POS". If the "Observe Results" option is chosen, the user is directed through branch 30 to page 32 (See FIG. 3*a*) in which the user may view the auction results which the issuer chooses to make available. See FIG. 6 for an example of an observation page 32. For example, the issuer may choose to show only the amount and name of winning bidders or may choose to display complete bid histories for the auction. Preferably the information to be made available after the auction will be disclosed in advance to the auction participants.

When an upcoming or current auction is selected at selections page 26, the user is directed through current auctions branch 34 to a login page 36 (See FIG. 3*a*). If the user selects "Enter Auction" for a trial auction, trial auction branch 38 takes the user to login page 40. The login page 40 may appear as shown in FIG. 7.

In the selections page 26, the user is provided with the multiple linked options "View Notice of Sale," "View Amendments", etc. Depending upon which issue is selected, the corresponding document will be displayed. That is shown collectively as "View Documents" 42 in FIG. 3*a*.

The "View Notice of Sale" option causes the complete text of the Notice of Sale to be displayed to the user. The Notice of Sale is provided to the auctioneer in advance by the Issuer, typically in machine-readable form, is converted to HTML or Adobe Acrobat, and stored on the auctioneer's web server for access by users.

The "View POS" option takes the user to an acknowledgment page shown in FIG. 8. To view the POS, the user must first acknowledge that the user is eligible to bid. If the user indicates that the user is not eligible, then the user returns to the selections page 26. Selection of the "eligible" option causes the complete text of the Preliminary Official Statement for the issue selected to be displayed. The POS is supplied to the auctioneer typically in machine-readable form by the Issuer, converted to HTML text or Adobe Acrobat, and then stored on the auctioneer's web server for access by users. Because the POS is a multi-page document, the auctioneer may create hypertext links to various parts of the POS from the items listed in the related table of contents to facilitate quick access by the user to selected portions of the document or rapid review and retrieval of information.

A "View Rules of Auction" link (not shown) may be provided which causes a text document stipulating the rules and conventions that all bidders must acknowledge or agree to abide by when participating in the auction. It also explains how disputes, if any, will be resolved, how bids are sequenced (e.g., first-in, first-out) and processed by the source code, what mathematical formulas and conventions are used to calculate prices and yields, and how purchase amounts may be altered after the auction to accommodate re-sizing.

The log-in page 36 is used to ensure that the user is identified and is verified to be legitimate. It requires the user, as a condition to entering the specific auction chosen, to enter its company identification number (ID) assigned by the auctioneer and their password, which is predetermined by the user. If the ID number or password is not correct as shown at step 44, the user will link automatically to an Error message (not shown) explaining that one (or both) is incorrect and that they should click the BACK button to return to the log-in page 36. After a correct log-in of a registered user is checked at step 44, the system checks at step 46 to determine if this registered user is admitted or allowed to participate in the selected auction, and verifies their status at step 48. If properly registered and admitted, the user is directed to verification page 50.

The verification page 50, an example of one type of which is shown in FIG. 9, is used as a double check on the identity of the user and to verify that the user, if bidding, agrees to abide by the rules of the auction. It contains a list of questions that must be answered affirmatively by clicking the "yes" response option after each one before the user can proceed to the auction page. If any of the questions is not answered or answered "no" as verified at step 52, the user will be linked to an error message 54 identifying the question (or questions) which has not been answered properly and directing the user to either contact the Administrator (by e-mail link) for assistance or click the BACK button to return to the verification page 50. The verification procedure provides a documented history that the user has reviewed the relevant materials including the Notice of Sale and POS. If an acknowledgement from the user, i.e. answering yes to all the questions, is not received, step 52 prevents the user from participating in the auction.

As shown in FIG. 9, three of the questions contain direct links to the Notice of Sale and Amendments, POS, and Rules of MuniAuction, respectively, which the bidder can view if the bidder has not already done so.

Although not currently implemented, the verification page 50 could also allow bidders to select the bid format they would like to use on the bid preparation and submission page 56 which follows, choosing either to enter the price and coupon combination or coupon and yield combination.

The bid preparation and submission page 56 is an electronic spreadsheet, or bid preparation sheet, representative examples of which are shown in FIGS. 10 and 11 and are labeled "Auction." The bid preparation and submission page 56 displays a schedule of the principal maturity amounts 66 and due dates 68 for the issue to be auctioned as well as selected bid information 70 associated with the bid for each maturity.

The selected bid information 70 is predetermined by the issuer prior to the auction and is updated continuously throughout the auction. By displaying a current best bid, which is optional, an open bid auction may be implemented. The bid status information which is displayed to each of the users may include, for example, one or more of the following: the yield of a leading bid, the identity of leading bidders, the status of the bidders (i.e., "Leader/Not Leader"), or a "no bid" status on a portion of the financial instrument. Any other appropriate information relating to the bids or the auction may also be included.

FIG. 10 illustrates a blank form upon which a user may prepare a proposed maturity by maturity bid. The user enters a coupon and price, or yield, for each principal maturity it wants to purchase. To determine the yield associated with the price and coupon combination (or the price associated with their coupon and yield combination) without actually submitting a bid, the user can click the "Calculate/Refresh" button 72, which calculates the yield (or price) without actually submitting it. If the user submits a bid and it results in a yield lower than the "best yield", whether shown or not, for that maturity, the user may choose to click the "Submit Bid" button 74 and become the new "Leader" with the "best yield" for that maturity (provided time remains before the auction ends). In a maturity by maturity auction only, if no other bidder submits a better bid before the auction ends, then the leader becomes the successful bidder or "Winner" of the auction for the relevant maturity or maturities.

FIG. 11 illustrates a blank form upon which the user may prepare a proposed all-or-none bid. The user enters a coupon for each maturity and an aggregate purchase price 77, and at the Issuer's option, a price or yield for each maturity. To determine the true interest cost (TIC) associated with the aggregate purchase price 77 and coupons combination without actually submitting a bid, the user can click the "Calculate/Refresh" button 72 which calculates the TIC without actually submitting it. If the result is a TIC lower than the "best TIC" shown, if shown, the user may choose to click the "Submit Bid" button 74 and become the new "Leader" with the "best TIC" (provided time remains before the auction ends). In an all-or-none auction only, if no other bidder submits a better bid before the auction ends, then the leader becomes the successful bidder or "Winner" of the auction.

In a maturity by maturity versus all-or-none auction, FIGS. 10 and 11 apply to maturity by maturity and all-or-none bidders, respectively. The process of calculating and submitting bids is the same, but in this format, the best maturity by maturity TIC (i.e., the aggregate TIC associated with the best yields for each maturity submitted by one or more bidders) is compared with the best all-or-none TIC (submitted by one bidder) and the lowest TIC of the two determines which bidder(s) is (are) the leader(s) or winner (s), during or once the auction is over, respectively.

The Calculate/Refresh 72 function is of great convenience. It can be implemented either in spreadsheet mode (in which a calculate/refresh operation is performed each time any entry is changed), or in delayed mode (in which calculate/refresh is performed only on demand by the user). Additionally, the spreadsheet may display the last submitted bid in field 76, which displays to the user the last submitted bid by that user. In FIG. 10, field 76 is above a column that displays this information without overwriting the remaining sections of the spreadsheet. The electronic spreadsheet is therefore adapted to display the users last submitted bid simultaneously with the bid information on the spreadsheet. In another embodiment, the bid preparation and submission page 56 may optionally assist the user in optimizing his bid.

According to one embodiment of the invention, and at the option of the Issuer, if the user attempts to submit a bid which results in a higher yield than a bid it has already submitted which became the current leading bid, it is linked to an error message page (not shown) indicating that the user is attempting to submit a bid which is worse than one they have already submitted. At that point the user should click the BACK button to return to the bid preparation and submission page 56.

Users may submit bids for one or more of the maturities listed or none at all. If a user submits a bid which does not conform to the specifications in the Notice of Sale (e.g., minimum/maximum price per maturity or coupon multiple parameters), it is linked to an error message page, an example of which is shown in FIG. 12, describing which parameter is improper and instructing the user to click the BACK button to return to the bid preparation and submission page 56.

All bids must be submitted before the auction ends. The "Start" time, "End" time and current time or "Time of Last Update" may be shown at the top of the bid preparation and submission page 56. Whenever users click the "Calculate/Refresh" button 72 or "Submit Bids" button 74, "Time of Last Update" is updated to the current time so that the user can keep track of how much time remains before the auction ends. In an alternative embodiment, "Time of Last Update" is updated automatically at brief intervals, for example, at one-second intervals.

After a user selects the submit button 74 and the bid is verified as conforming to the bid parameters, the bidder is presented with a confirmation screen, an example of which is shown in FIG. 13, to confirm the bid prior to submission. As shown in FIG. 13, a summary of the bid is presented to the user in this confirmation. If confirmed, the bid will be electronically submitted to the auctioneer computer 10. The confirmation gives a safety check to users to help them avoid the submission of erroneous or undesired bids.

Figure 3B:
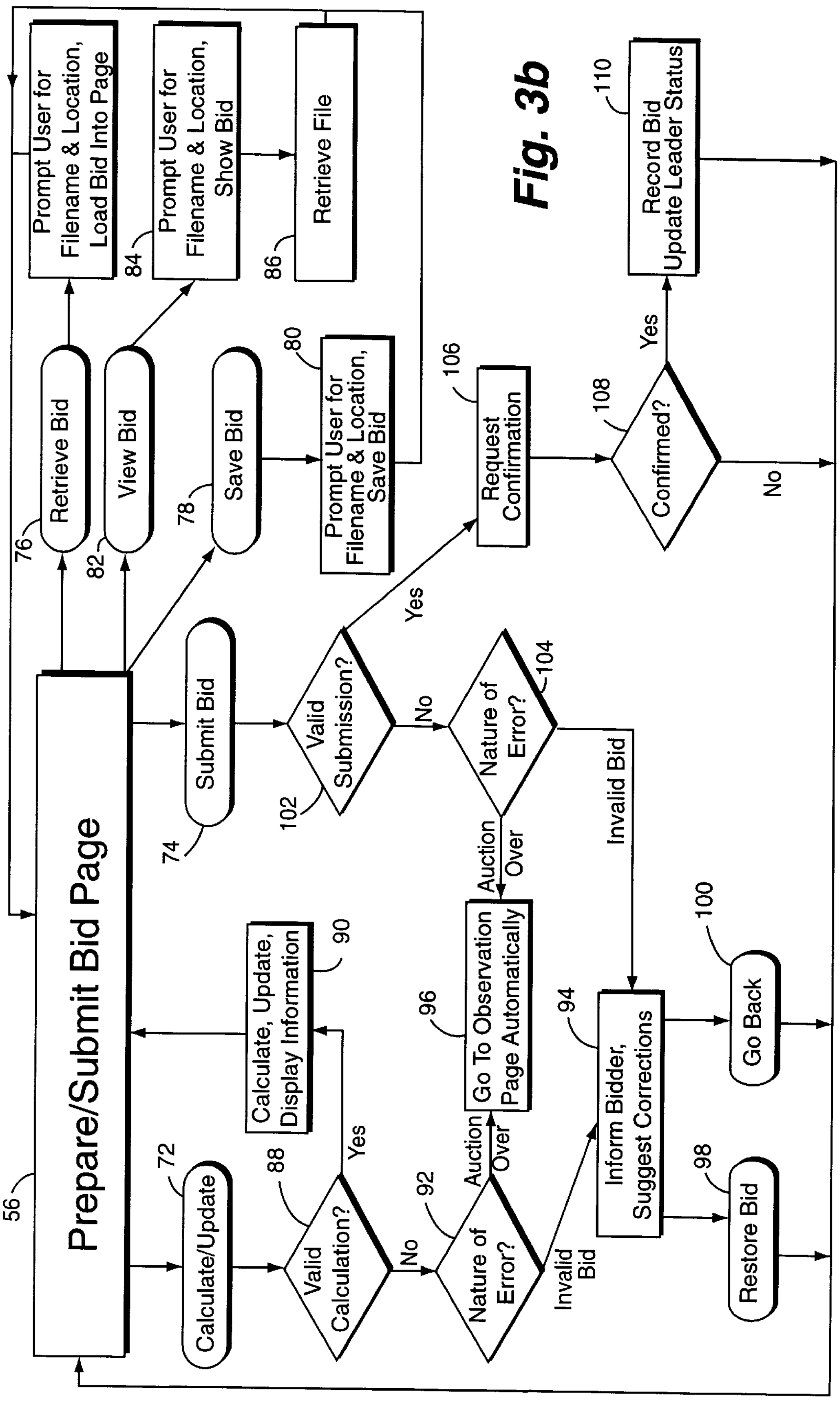
FIG. 3*b* is a flow chart illustrating the overall process flow with respect to the preparation and submission of a bid.

The bid preparation process and submission process described above is summarized in the flow chart in FIG. 3*b*. Beginning with the bid preparation and submission age 56, the user can select "calculate/update" 72, "submit bid" 74 or "retrieve bid" 76 as described above. Additionally the user may save a proposed bid at step 78 in which case the user is asked to name the file at step 80 for future recovery of the bid. Previously saved proposed bids may be viewed by selecting "view bid" 82 in which case the user is prompted to identify the file containing the saved bid at 84 and the file is retrieved and displayed at step 86.

In selecting the calculate/update option 72 a check is made at step 88 to determine if the calculation is meaningful in the context of the given auction. If the calculation is meaningful the displayed bid is updated at step 90. If the calculation is not meaningful, the nature of the error is determined at step 92 and the bidder is informed of the error with proposed corrections at step 94 unless the auction is over in which case the user is taken to the observation page at step 96. The proposed corrections to an error in the bid will allow the user to restore a previous correct bid at step 98 or go back to allow the user to correct the current proposed bid at 100.

In a similar fashion to the calculation/update process, the submit bid process verifies that the bid to be submitted it meaningful and in accordance with the appropriate predetermined bid parameters for this auction at step 102. If an error is present in the bid, the error is examined at step 104 in the same manner as step 92 of the calculation/update process. Thereafter, the process proceeds with either step 94 or 96 as discussed above. If the bid was valid at step 102, then confirmation is requested at step 106 wherein the user is displayed a summary of the bid prior to bid submission as described above. If the bid is confirmed by the user at step 108 it is submitted and recorded by the auctioneer's computer 10 at step 110.

Returning to FIG. 3*a*, the Observation mode 112 provides a special page for the Issuer and Issuer's financial advisor, or appropriate third party observers, to view the auction in progress. It shows the selected bid information of bids submitted. The observer can view a running list of best bids 114, individual bids 116 and cover (i.e., second place) bids 118. Such information may be displayed in a manner very similar to that shown in FIG. 6. As with the observe results page 32, the information illustrated on the relevant pages 114, 116, and 118 regarding the bids is predetermined before the auction. A particular Issuer may not wish to have all the bid information, such as non-winning bid histories, listed. The observation pages are updated throughout the auction by clicking the "Refresh" button. In an alternative embodiment, the observation pages are continuously updated. The observation page may be automatically accessed by Issuer and Issuer's financial advisor when "Enter Auction" is clicked and after these users enter a special ID number and password at the login page 36. The observation mode 112 also accommodates other requests of information stored in the database from users as schematically illustrated at element 120 in FIG. 3*a*.

The Observation mode may show the true interest cost of individual bids when there are bids for every maturity in the issue and winning bids and cover bids. It also may show the "resized" principal maturity amounts that coincide with the Notice of Sale parameters, the Issuer's objectives (e.g., level annual debt service), and a summary of all bids submitted by bidders.

The trial auction branch 38 leads to the login page 40 and a verification page 124 which operate similar to the login page 36 and verification page 50, respectively, previously described except that the login page 40 allows any user to select whether they want to go to the trial auction page 126 where they can practice bidding or the observation page 112 where they can observe bids. The trial auction 126 is one or more screens which simulate a real auction such that a bidder can become accustomed to the operating system without entering into an actual auction. From the trial auction page 126 the user is provided with a plurality of options such as viewing various documents, returning to the home page, etc.

The Administration menu 128 is for use by the technical staff of the auctioneer to create, modify or terminate auctions, add or remove bidders, allow user access to applicable pages (e.g., bidders to the auction page and Issuers to the observation page), and view auctions in progress. The operation of the administration menu 128 is schematically illustrated in the flow chart of FIG. 3*c* and two of the web pages accessible therefrom are shown in FIGS. 14 and 15. These pages may also show the true interest cost of the winning bids and the resized principal amounts as described above.

Figure 3C:
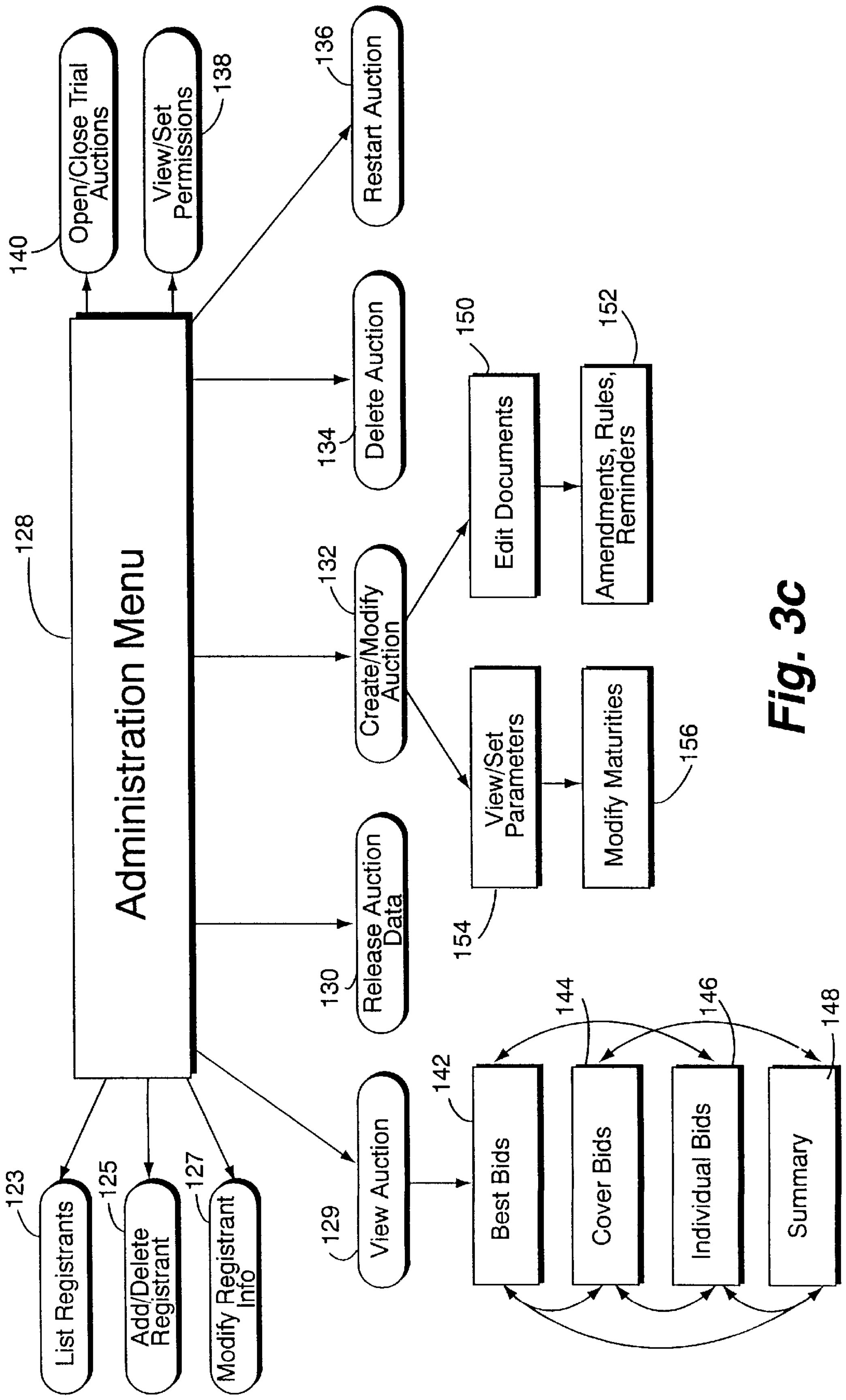
FIG. 3*c* illustrates the options available from an administration menu.

In FIG. 3*c*, the administrator can list registrants at step 123, add/delete registrants at step 125, or modify registrant information at step 127 as shown in FIG. 14. The administrator can view an ongoing auction at 129, release selected auction data for completed auctions at step 130, create or modify up-coming auctions at step 132 as shown in FIG. 15, delete an auction at step 134, restart an auction at step 136, view and/or set permission parameters at step 138, and open/close trial auctions at step 140. In the viewing of the auction at 129, the administrator may select best bids at 142, cover bids at 144, individual bids at 146, or a summary at 148 for viewing. In creating or modifying up-coming auctions at step 132, the administrator may choose to create or modify existing documents at 150 which will take him to the selected document at step 152, or may choose to set and or change auction parameters at 154 and/or maturity dates and amounts at 156.

At the end of an action, all winning bidders will automatically receive preliminary e-mail confirmations of their winning bids and purchase amounts (as resized), as well as a reminder that when the Issuer has made the formal award of bonds, they will receive another, final, e-mail confirmation 130.

A bidders log is provided containing a record of every bid submitted by every bidder during an auction. It identifies the bidder, the ID number and password entered by the bidder, the responses by that bidder to the questions on the verification page and the entries made by the bidder which were submitted as bids, whether winning bids or not.

Electronic mail (e-mail) confirmation is automatically generated to users on the occurrence of selected events. When a registered bidder enters its ID number and password, an e-mail confirmation is immediately sent to confirm the fact that they have entered an auction. If, for example an impostor somehow succeeds in impersonating a bidder, the bidder will receive e-mail showing that the auctioneer believes the bidder has entered the auction. This serves as a cross-check for security purposes.

The present invention provides several advantages over the prior art such as allowing bidders from around the world to participate simultaneously in a real-time auction of an original issuer financial instrument, providing bidders in an original issuer auction with computational tools, such as spreadsheets, with which to compose and compute associated cost values with their bids, providing facilities for the auctioneer in an original issuer auction to receive and evaluate bids in real-time, allowing for anonymity in silent real-time auctions or full disclosure in open auctions, requiring submitted bids to be within the Issuer's parameters, and increasing the speed at which bidders may bid so that the largest number of bids can be submitted prior to the close of an auction.

Following are further advantages of the present invention relating to original issuer actions of financial instruments:

1. Replacing bidding by fax, personal delivery or other methods;
2. Providing an integrated system running on a single server that:
   (a) allows bidders to prepare bids and submit them without transcribing them or using extraneous commercial software or equipment such as Bid Comp, Monroe Bond Calculators, Bond Buyer Worksheets, interfaces, etc.;

(b) enables issuers, financial advisors and third party observers to view auctions in progress including selected bid information such as winning bids and bidders;

(c) may automatically send documentation in the form of electronic confirmations of bidder admission to auction and winning bids;

(d) may calculate true interest cost (TIC) of winning bid combinations and resize issue without requiring the Issuer or financial advisor to run separate software programs or customize spreadsheet programs;

(e) permits the auction administrator to create, modify and view auctions in progress; and (f) provides one on-line location where the Notice of Sale and Preliminary Official Statement (POS) can be viewed (and amended by the Issuer) to assist bidders in preparing bids;

3. Allowing primary offerings of municipal bonds to be conducted as real-time auctions in which bidders can view selected bid information such as the best bid for each maturity and are given the opportunity to make a better offer while the auction is in progress;
4. Obviating the need for special software or hardware installation at the bidders', or Issuer's locations by allowing bidders and Issuers to use any personal computer, any Internet service provider and any web browser;
5. Allowing bids to be submitted for selected bond maturities within a new issue, rather than exclusively on an all-or-none basis;
6. Allowing an auctioneer to conduct multiple auctions simultaneously using the same web server and a single administrator;
7. Allowing bidders to participate in a plurality of auctions simultaneously or consecutively;
8. Improving the security of auctions by providing bidders and other parties that access bidding information with electronic signatures via an identification number and password and to log all bids submitted by each bidder throughout an auction;
9. Obtaining electronic verification from bidders that they have read and agree to certain legal documents associated with a bond issue, retaining their responses in a log, and if they answer "no" that they have not read the documents or do not agree with them, denying such bidders access to the auction until they answer "yes";
10. Providing a bidder with automatic notification describing any non-conforming entry via error messages when a bid does not conform to the Issuer's specifications in a Notice of Sale;
11. Providing a built-in official auction clock that keeps bidders informed of time remaining before the auction ends; and
12. Enabling bidders to recalculate and refresh a display of aspects of their bids, including calculated yield or prices associated with their entries before submitting them as formal bids.

The above described system is intended only to be illustrative of the present invention and not restrictive thereof. For example, one anticipated operation of the present invention will be to conduct all-or-none and maturity by maturity auctions for the same Issuer where the individual bidders status is not displayed to the bidder, but only a display of which maturities have not yet received a bid is presented to the bidders during the auction as the selected bid information. Additionally the present invention may be designed to allow bids to be prepared by existing information services and have these loadable into the present system through steps 84/86 shown in FIG. 3*b*.

Another aspect of the present invention is that it allows appropriate third parties to create and conduct auctions. If multiple separate administrators are allowed then additional security may be added to limit an administrator's access to only those auctions which it is controlling.

Further options of the present system may include:

1) Saving of bids prepared on the present system for later access and retrieval by the bidder;
2) Automatic ranking and rating of bids received to determine the best bids, wherein numerically tied bids may be broken by the time of receipt of the bids;
3) Allowing institutional investors to view the contact information for bidders who have requested access to a given auction;
4) Having bidders select to submit bids at re-offering rates and prices;
5) Having the auctioneer identify whether a bidder's bid is priced at yield to call or yield to maturity, as applicable;
6) Having the calculations be moved to the client side to reduce the hits on the home page server and increase bidder's privacy and susceptibility to network delays; and
7) Having bidders presented with the option of digitally signing bids for security which would use known standard signature schemes in either a separate or JAVA integrated utility.

It will be appreciated that although the embodiments described herein relate to financial instruments such as municipal bond auctions, the disclosed process is applicable to many other types of auctions. Various modifications may be made to the present invention without departing from the spirit and scope thereof. It will be apparent to those skilled in the art how to adapt the present invention to variant types of auctions. The scope of the present invention is to be defined by the appended claims.

What is claimed is:

1. In an electronic auction system including an issuer's computer having a display and at least one bidder's computer having an input device and a display, said bidder's computer being located remotely from said issuer's computer, said computers being coupled to at least one electronic network for communicating data messages between said computers, an electronic auctioning process for auctioning fixed income financial instruments comprising:

inputting data associated with at least one bid for at least one fixed income financial instrument into said bidder's computer via said input device;

automatically computing at least one interest cost value based at least in part on said inputted data, said automatically computed interest cost value specifying a rate representing borrowing cost associated with said at least one fixed income financial instrument;

submitting said bid by transmitting at least some of said inputted data from said bidder's computer over said at least one electronic network; and communicating at least one message associated with said submitted bid to said issuer's computer over said at least one electronic network and displaying, on said issuer's computer display, information associated with said bid including said computed interest cost value, wherein at least one of the inputting step, the automatically computing step, the submitting step, the communicating step and the displaying step is performed using a web browser.

2. The process of claim 1 additionally comprising the step of verifying that each bid is in conformance with predetermined bid parameters before accepting said bid.

3. The process of claim 2 additionally comprising the step of providing information to said bidder's computer display in the event said bid is non-conforming.

4. The process of claim 1 additionally comprising the step of screening said bidder.

5. The process of claim 1 additionally comprising the steps of setting a predetermined closing time for an auction, and providing information after the close of the auction about the bids accepted during the auction.

6. The process of claim 1 wherein said step of submitting a bid includes the step of providing said bidder's computer with an electronic bid calculation sheet, and wherein said sheet allows said bidder to prepare and automatically calculate at least one value associated with proposed bids prior to said step of submitting said bid.

7. The process of claim 6 additionally comprising the step of simultaneously displaying on said bidder's computer display, said electronic bid calculation sheet representing the bidder's last submitted bid together with proposed bid information.

8. The process of claim 1 wherein said bid submitting step includes submitting a bid on at least one of an entire financial instrument and on individual portions of the instrument.

9. The process of claim 1 additionally comprising the step of requesting, from the bidder, a confirmation before submission of said bid.

10. The process of claim 1 additionally comprising the step of requiring an electronic acknowledgment from said bidder over said at least one electronic network that said bidder has reviewed at least one of a notice of sale document and a prospectus document before permitting the bidder to perform the submitting step.

11. The process of claim 1 additionally comprising the step of indicating which maturities have not been bid upon.

12. The process of claim 1 wherein said system further includes an auctioneer's computer coupled to said at least one electronic network, and said submitting step comprises transmitting said data from said bidder's computer to said auctioneer's computer over said at least one electronic network.

13. The process of claim 12 further including accepting bid submissions with said auctioneer's computer only during a predetermined time period.

14. The process of claim 1 wherein said process further includes accepting bid submissions only during a predetermined time period.

15. The process of claim 1 wherein said inputting step includes inputting an interest rate or coupon for at least one maturity associated with at least one financial instrument including one or more series of maturities.

16. The process of claim 1 wherein said inputting step includes inputting an aggregate purchase price for one or more or all of a collection of financial instruments.

17. The process of claim 1 wherein said inputting step includes inputting at least one of a price and a yield for each maturity associated with a collection of financial instruments.

18. The process of claim 1 wherein said process further includes providing a centralized time indication and transmitting said time indication to said bidder's computer over said electronic network, and said displaying step includes the step of displaying said transmitted time indication on said bidder's computer display.

19. The process of claim 18 wherein said displaying step includes displaying an item, and said transmitting step and said time indication displaying step are performed in response to selection by said bidder of said displayed item through manipulation of said input device.

20. The process of claim 1 wherein said system further includes at least one observer's computer coupled to said electronic network, said observer's computer including a display, and said process further includes communicating at least some of said data inputted by said inputting step to said observer's computer over said at least one electronic network for display on said observer's computer display.

21. The process of claim 20 wherein communication of at least textual data to said observer's computer is performed in real time response to said submitting step.

22. The process of claim 20 wherein said communicating step is performed in real time response to said submitting step.

23. The process of claim 1 further including storing, in a computer memory, predetermined terms for submitting a bid; and said method further includes automatically testing whether said inputted data complies with said stored predetermined terms for submitting a bid, and displaying an error message on said bidder's computer display if said testing step reveals said inputted data does not comply with said stored predetermined terms.

24. The process of claim 1 wherein said computing step comprises computing the true interest cost.

25. The process of claim 1 wherein said inputting step includes designating each maturity of a collection of financial instruments as serial, sinker or term structures.

26. The process of claim 1 further including electronically communicating at least one of a notice of sale document and a prospectus document over said at least one electronic network to said bidder's computer.

27. The process of claim 1 further including displaying, on said bidder's computer display, whether or not said submitted bid is the leading bid.

28. The process of claim 27 wherein said process accepts bids from at least one further bidder computer, and said first-mentioned bidder's computer display displays details about bids submitted via said first-mentioned bidder's computer but not details about bids submitted by said further bidder computer.

29. The process of claim 1 wherein said process further includes automatically verifying said inputted data.

30. The process of claim 1 wherein said process accepts bids from at least one further bidder computer, and said first-mentioned bidder's computer display displays details about bids submitted via said first-mentioned bidder's computer but not details about bids submitted by said further bidder computer.

31. In an electronic auction system including plural bidders' computers and an issuer's computer located remotely from said plural bidders' computers, each of said plural bidders' computer including an associated input device and a display, said issuer's computer including a display, at least one electronic network communicating data messages to and from said plural bidders' computers and to and from said issuer's computer, an electronic auctioning process for auctioning fixed income financial instruments comprising:

at at least one of said plural bidders' computers, inputting data associated with at least one bid for fixed income financial instruments via said associated input device;

automatically computing at least one interest cost value based at least in part on said inputted data, said automatically computed interest cost value specifying a rate representing borrowing cost associated with said fixed income financial instruments;

ordering the interest cost values associated with said inputted data;

transmitting said interest cost values over said at least one electronic network to said issuer's computer; and displaying said interest cost values on said issuer's computer's display, wherein at least one of the inputting step, the automatically computing step, the ordering step, the transmitting step and the displaying step is performed using a web browser.

32. The process of claim 31 wherein said ordering step includes ranking said interest cost values, and said displaying step comprises displaying said interest cost values in an order determined by said ranking.

33. The process of claim 31 further including awarding the fixed income securities to the one of said plural bidders first submitting a bid with the most favorable interest cost value.

34. The process of claim 31 wherein said system further includes an auctioneer's computer coupled to said at least one electronic network, and said process further includes transmitting said inputted data from at least one of said plural bidders' computers to said auctioneer's computer over said at least one electronic network.

35. The process of claim 34 further including accepting bid submissions with said auctioneer's computer only during a predetermined auction time period.

36. The process of claim 31 wherein said process further includes accepting bid submissions only during a predetermined auction time period.

37. The process of claim 31 wherein said inputting step includes inputting an interest rate or coupon for at least one maturity associated with at least one fixed income financial instrument including one or more series of maturities.

38. The process of claim 31 wherein said inputting step includes inputting an aggregate purchase price for one or more or all of a collection of fixed income financial instruments.

39. The process of claim 31 wherein said inputting step includes inputting at least one of a price and a yield for each maturity associated with a collection of fixed income financial instruments.

40. The process of claim 31 wherein said process further includes providing a centralized time indication and transmitting said time indication to each of said plural bidders' computers over said electronic network, and said process further includes displaying said transmitted time indication on each of said plural bidders' computer displays.

41. The process of claim 40 further including displaying items on said plural bidders' computers, and said time indication displaying step is performed in response to selection of said displayed items through manipulation of said input devices.

42. The process of claim 31 wherein said system further includes at least one observer's computer coupled to said electronic network, said observer's computer including a display, and said process further includes communicating at least some of said data inputted by said inputting step to said observer's computer over said at least one electronic network for display on said observer's computer display.

43. The process of claim 42 further including submitting at least one bid based on the inputting step, and communication of at least textual data to said observer's computer is performed in real time response to said submitting step.

44. The process of claim 31 further including submitting at least one bid based on the inputting step, and wherein said communicating step is performed in real time response to said submitting step.

45. The process of claim 31 further including storing, in a computer memory, predetermined terms for submitting a bid; and said method further includes automatically testing whether said inputted data complies with said stored predetermined terms for submitting a bid, and displaying an error message on at least one of said plural bidders' computer displays if said testing step reveals said inputted data does not comply with said stored predetermined terms.

46. The process of claim 31 wherein said computing step comprises computing the true interest cost.

47. The process of claim 31 wherein said inputting step includes designating each maturity of a collection of fixed income financial instruments as serial, sinker or term structures.

48. The process of claim 31 further including electronically communicating at least one of a notice of sale document and a prospectus document over said at least one electronic network to each of said plural bidders' computers.

49. The process of claim 31 further including displaying, on at least one of said plural bidders' computer displays, whether or not said bid submitted via the at least one bidders' computer is the leading bid.

50. The process of claim 31 wherein said process further includes automatically verifying said inputted data.

51. The process of claim 31 additionally comprising the step of verifying that each bid is in conformance with predetermined bid parameters before accepting said bid.

52. The process of claim 51 wherein the verifying step is performed upon submission of the bid.

53. The process of claim 31 additionally comprising the step of screening each of said plural bidders.

54. The process of claim 31 additionally comprising the steps of setting a predetermined closing time for an auction, and providing information after the close of the auction about the bids accepted during the auction.

55. The process of claim 31 wherein said step of submitting a bid includes the step of providing each of said plural bidders' computers with an electronic bid calculation sheet, and wherein said sheet allows each of said plural bidders to prepare and automatically calculate at least one value associated with proposed bids prior to submitting said bid.

56. The process of claim 31 additionally comprising the step of requesting, from at least one bidder, a confirmation before submission of a bid by said at least one bidder.

57. The process of claim 31 additionally comprising the step of indicating which maturities have not been bid upon.

58. The process of claim 31 additionally comprising the step of providing information to at least one of said plural bidders' computer displays in the event said bid is nonconforming.

59. The process of claim 31 additionally comprising simultaneously displaying on at least one of said plural bidders' computer displays, an electronic bid calculation sheet representing the bidder's last submitted bid together with proposed bid information.

60. The process of claim 31 wherein said inputting step includes submitting a bid on at least one of an entire fixed income financial instrument and on individual portions of the instrument.

61. The process of claim 31 additionally comprising the step of requiring an electronic acknowledgement from at least one of said plural bidders over said at least one electronic network that said bidder has reviewed at least one of a notice of sale document and a prospectus document before permitting said bidder to submit the bid.

62. The process of claim 31 further including automatically testing whether said inputted data complies with stored predetermined terms for submitting a bid.

63. The process of claim 31 wherein an observer uses a web browser coupled to the network to view the auction in process.

64. The process of claim 63 wherein the observer's web browser displays selected bid information of bids submitted.

65. The process of claim 63 wherein the observer's web browser displays a winning list of best bids.

66. The process of claim 63 wherein the observer's web browser updates a display of the auction in progress in response to clicking a refresh button.

67. The process of claim 63 wherein the observer comprises the issuer.

* * * * *